(12) United States Patent
Hasegawa

(10) Patent No.: US 8,791,970 B2
(45) Date of Patent: Jul. 29, 2014

(54) INFORMATION PROCESSING DEVICE, LASER IRRADIATION DEVICE, DRAWING INFORMATION GENERATING METHOD, CONTROL SYSTEM, AND PROGRAM

(75) Inventor: Fumihiro Hasegawa, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 194 days.

(21) Appl. No.: 12/779,259

(22) Filed: May 13, 2010

(65) Prior Publication Data

US 2010/0289866 A1 Nov. 18, 2010

(51) Int. Cl.
*B41J 2/00* (2006.01)
*B41J 2/435* (2006.01)

(52) U.S. Cl.
CPC ... *B41J 2/00* (2013.01); *B41J 2/435* (2013.01)
USPC ............................ 347/110; 347/262; 347/264

(58) Field of Classification Search
CPC .................................... B41J 2/00; B41J 2/435
USPC .......................... 347/110, 224, 225, 262, 264
See application file for complete search history.

(56) References Cited

U.S. PATENT DOCUMENTS

| | | | | |
|---|---|---|---|---|
| 5,867,174 | A * | 2/1999 | Aoki et al. ..................... | 345/472 |
| 8,284,226 | B2 * | 10/2012 | Hasegawa et al. ............. | 347/224 |
| 2006/0221424 | A1 * | 10/2006 | Utagawa et al. ............... | 359/212 |
| 2007/0176804 | A1 * | 8/2007 | Abe et al. ........................ | 341/84 |
| 2010/0039916 | A1 | 2/2010 | Hasegawa et al. | |

FOREIGN PATENT DOCUMENTS

| | | |
|---|---|---|
| JP | 01-262149 | 10/1989 |
| JP | 3146771 | 1/2001 |
| JP | 2004-90026 | 3/2004 |
| JP | 2004-341373 | 12/2004 |
| JP | 2007-152580 | 6/2007 |
| JP | 2008-219793 | 9/2008 |

OTHER PUBLICATIONS

Japanese Office Action mailed on Jun. 11, 2013 in Japanese Patent Application No. 2009-118908 filed May 15, 2009.

* cited by examiner

*Primary Examiner* — Alessandro Amari
*Assistant Examiner* — Kendrick Liu
(74) *Attorney, Agent, or Firm* — Oblon, Spivak, McClelland, Maier & Neustadt, L.L.P.

(57) ABSTRACT

An information processing device for generating a piece of drawing information of a line image, including a shape information storing part to store pieces of shape information for respective combinations of a thickness and a size of a line image, a thickness information obtaining part to obtain a piece of thickness information, a code information obtaining part to obtain a piece of code information of a target image, a size information obtaining part to obtain a piece of size information of a target image, a shape information selecting part to select a piece of shape information out of pieces of shape information for each character based on the thickness information and the size information, and a drawing information generating part to read out the selected shape information from the shape information storing part and to generate a piece of drawing information from the shape information.

17 Claims, 16 Drawing Sheets

```
m    24    24
d    88    24
m    56    24
d    56   224
d    24   176
```

```
[0]   48    48   176    48
[1]  112    48   112   448
[2]  112   448    48   352
```

```
t    32
m    48    48
w    50
d   176    48
w    50
m   112    48
w    50
d    48   352
```

|     |     |     |     |     |
|-----|-----|-----|-----|-----|
| [0] | 48  | 48  | 176 | 48  |
| [1] | 112 | 48  | 112 | 448 |
| [2] | 112 | 448 | 48  | 352 |

|     |     |     |     |     |
|-----|-----|-----|-----|-----|
| [0] | 48  | 48  | 80  | 48  |
| [1] | 112 | 48  | 112 | 448 |
| [2] | 80  | 400 | 48  | 352 |
| [3] | 144 | 48  | 176 | 48  |

| t | 32  |     |
|---|-----|-----|
| m | 48  | 48  |
| w | 50  |     |
| d | 80  | 48  |
| m | 112 | 48  |
| w | 50  |     |
| d | 112 | 448 |
| m | 80  | 400 |
| w | 50  |     |
| d | 48  | 352 |
| m | 144 | 48  |
| w | 50  |     |
| d | 176 | 48  |

FIG.8

THICKNESS 0.4 mm,
CHARACTER SIZE 2.0 mm
(STANDARD FONT DATUM)

THICKNESS 0.4 mm,
CHARACTER SIZE 1.6 mm
(SMALL-SIZED FONT DATUM)

THICKNESS 0.4 mm,
CHARACTER SIZE 1.6 mm
(STANDARD FONT DATUM)

STANDARD FONT

SMALL-SIZED FONT
FOR THE CASE THAT
THE HORIZONTAL SIZE
IS SMALL

SMALL-SIZED FONT
FOR THE CASE THAT
THE VERTICAL SIZE
IS SMALL

SMALL-SIZED FONT
FOR THE CASE THAT
BOTH THE VERTICAL SIZE
AND THE HORIZONTAL
SIZE ARE SMALL

FIG.16D
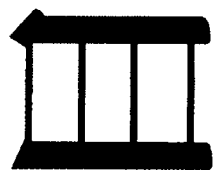
FIG.16B
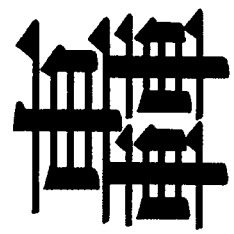
FIG.16E
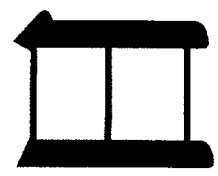
FIG.16C
FIG.16F
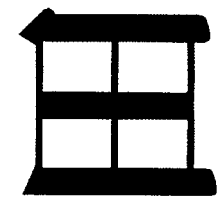
FIG.16G
FIG.16A

INFORMATION PROCESSING DEVICE, LASER IRRADIATION DEVICE, DRAWING INFORMATION GENERATING METHOD, CONTROL SYSTEM, AND PROGRAM

BACKGROUND OF THE INVENTION

1. Field of the Invention

The present invention relates to a an information processing device, a laser irradiation device, a drawing information generating method, a control system, and a program for generating drawing information for drawing a line image such as a character contiguously or discontiguously.

2. Description of the Related Art

A heat sensitive paper is sometimes used as a label for printing an address of an article or a name of an article. For example, such a heat sensitive label is attached to a plastic container used in a factory. The heat sensitive label has a property of changing color by heat and allows for writing of characters and symbols by using a thermal head or the like.

A rewritable type of such a heat sensitive label which can be written or erased repeatedly is now appearing. When used for commodity distribution, it is desirable to write or erase a label while being attached to a container. Thus, a method for drawing characters or the like by irradiating a label with a laser contiguously and heating the label has been proposed (see Patent Document 1 for example). The Patent Document 1 discloses a relay lens system transferring an image formed by a laser which comes from one end of a plurality of lens systems consisting of flexible joints, to the other end.

In addition, an image formation by a laser is known in the prior art (see Patent Document 2 for example). The Patent Document 2 discloses an image forming method which divides a single original image datum into a plurality of lines and irradiates a photoconductive drum with a laser with respect to each line.

Generally, a beam diameter of a laser is at least about 0.3 mm. Due to its relatively large beam diameter, a laser is often used with a stroke font for drawing characters or the like. That is, it is not necessary to specify an outline and fill in area within the outline as with an outline font commonly used for drawing characters or the like. The stroke font allows a character to be drawn just like writing a character in pencil by scanning a laser along coordinates defined by core line data of characters. If a change of a size of a character to be drawn is desired, coordinates of the original font datum are enlarged or reduced, a piece of drawing information for the character is newly generated, a rewritable medium is scanned by the laser along the coordinates, and the character is drawn.

However, due to limitations to a lower limit of a beam diameter of a laser beam (about 0.3 mm), there is a disadvantage in that writing a small sized character becomes difficult. That is, due to the thickness of a line to be drawn, it becomes difficult to discern crushed characters if drawn characters are small. If the line is like a very fine line drawn by a laser beam used in a laser printer, the line does not produce a crushed character even if the character is drawn by the stroke font in so far as the character has a size discernible by human. However, since a line drawn by a laser beam used for producing a change in color of a thermal rewritable medium is thick, in the case of complicated characters such as Chinese characters, it often becomes difficult to discern the characters, without 5-millimeters-square-size or so, due to an overlap between adjacent lines.

In a commonly-used printer or word processor software, a method for switching fonts according to a character size is known (see Patent Documents 3 and 4 for example). In printing or displaying a rather small character, the software prevents reduction of visibility by using a small-sized font datum for the same character.

Also, a printer which draws a character of any size by omitting a stroke, in rasterizing an outline font datum, if a line width of the stroke is less than or equal to a predetermined value, is disclosed (see Patent Document 5 for example).

However, since a line drawn by a laser used in a laser printer is very thin, drawing an outline by an outline font and filling in area with the outline is still a principal method. There is no technology which has devised a drawing method by a stroke font for the case of drawing a small sized character.

Now, in Patent Documents 3 and 4, a decision whether or not to use a small-sized font datum for drawing a small sized character is based only on a character size. However, for example, comparing the case of a line thickness of 0.3 millimeter and the case of a line thickness of 0.6 millimeter, even if the same character with the same size is drawn, the latter is more likely to be crushed (being "crushed" means "becoming unreadable due to overlaps between strokes of the character"). Thus, in the stroke font, it is difficult to decide whether or not to use a small-sized font datum based only on the character size.

That is, as described in Patent Documents 3 and 4, it is impossible to handle the stroke font simply by switching pieces of drawing information depending on a character size. In laser printer, since a line to be drawn is very thin and its drawing method is different from a drawing method of the stroke font, there is no need to consider a character thickness. Thus, it is impossible to apply technology of the laser printer to the drawing by the stroke font without change.

Moreover, in a printer described in Patent Document 5, if a rasterized stroke is thin, the printer omits the stroke. However, Patent Document 5 does not disclose improving visibility of a character in the case where a character drawn by a laser is thick.

In view of the above-mentioned problems, it is an object of the present invention to provide an information device, a laser irradiation device, a drawing information generating method, a control system, and a program, each of which draws a small sized character visibly by choosing a font datum appropriately even if a character size and a thickness of a line drawn by a laser are variable.

Patent Document 1: JP-A-2004-090026
Patent Document 2: JP-A-2004-341373
Patent Document 3: JP-A-2007-152580
Patent Document 4: JP-A-2008-219793
Patent Document 5: JP Patent 3146771

SUMMARY OF THE INVENTION

To achieve the object above, an embodiment of the present invention is an information processing device for generating a piece of drawing information of a line image drawn by intermittently imparting energy to chromogenic medium while changing a position to be imparted, characterized in that it comprises a shape information storing part configured to store pieces of shape information for a single line image depending on thickness and size of a line image, a thickness information obtaining part configured to obtain a piece of thickness information of a line image, a code information obtaining part configured to obtain a piece of code information of a target line image to be drawn, a size information obtaining part configured to obtain a piece of size information of a target line image to be drawn, a shape information selecting part configured to select a piece of shape information out of pieces of shape information for each character based on the piece of thickness information and the piece of size information, and a drawing information generating part configured to read out the piece of shape information selected by the shape information selecting part from the shape information storing part and to generate a piece of drawing information from the piece of shape information.

It is possible to provide an information processing device, a laser irradiation device, a drawing information generating method, a control system, and a program, each of which draws a small sized character visibly by selecting a font datum appropriately even if a character size and a thickness of a line drawn by a laser are variable.

Other objects, features and advantages of the present invention will become more apparent from the following detailed description when read in conjunction with the accompanying drawings.

BRIEF DESCRIPTION OF THE DRAWINGS

FIG. 8 is an example of a diagram showing a decision of a piece of lower limit information diagrammatically.

FIGS. 16A-16G are examples of Chinese characters.

DETAILED DESCRIPTION OF THE PREFERRED EMBODIMENTS

<First Embodiment>

Figure 1:
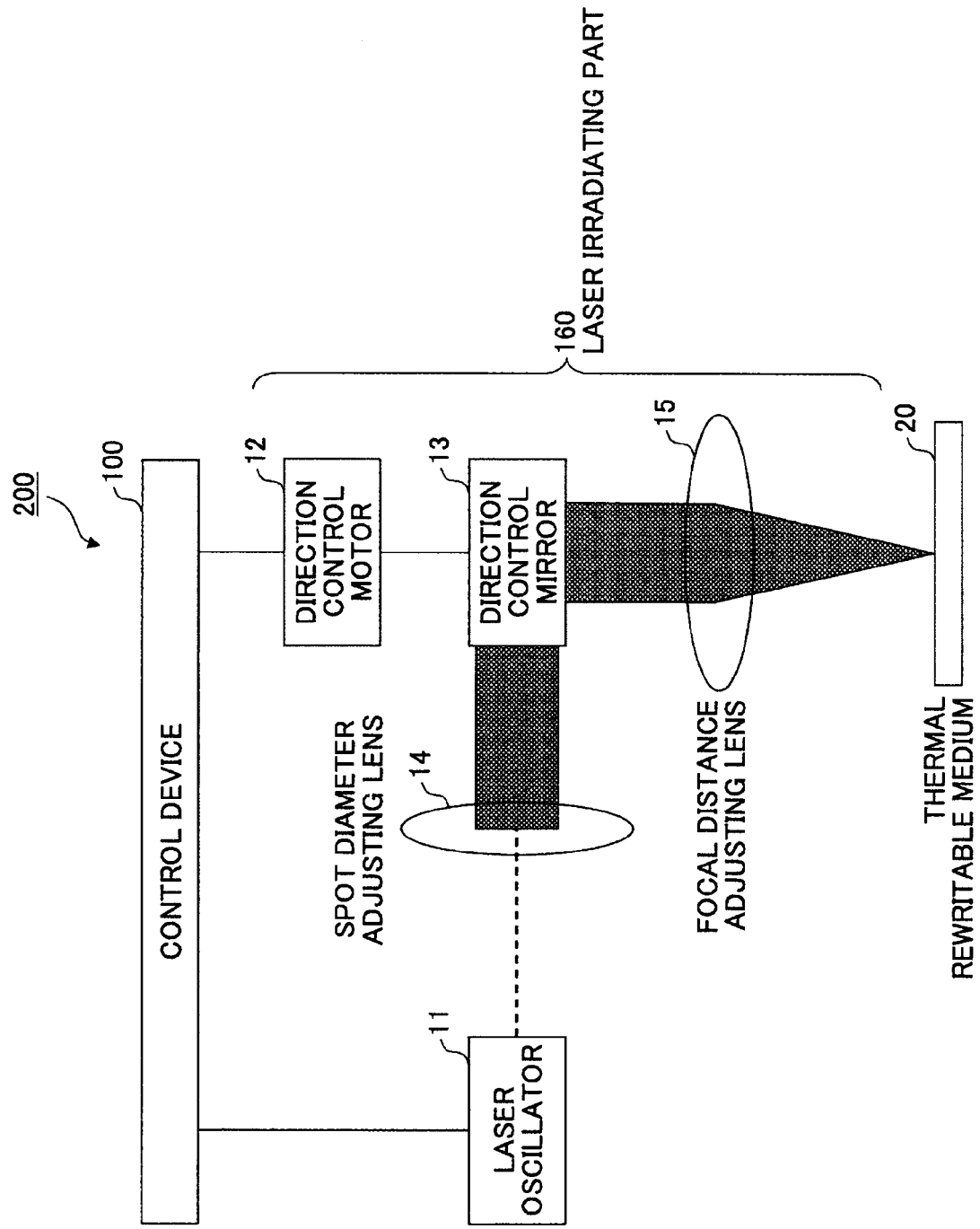
FIG. 1 is an example of a hardware configuration diagram of a laser irradiation device.

With reference to the figures, a mode for carrying out the present invention is described below.

Firstly, a summary of a laser irradiation device of the present embodiment is described.

The laser irradiation device draws a character by irradiating coordinates specified by a font datum of a stroke font with a laser beam. The laser irradiation device of the present embodiment switches between a font datum of a regular size (hereinafter called "standard font datum") and a font datum of a small size (hereinafter called "small-sized font datum") depending on both thickness of a line drawn by the laser beam and a character size as follows.

(1) The device prepares both the standard font datum and the small-sized font datum for each character in advance. The small-sized font datum omits a stroke lest the stroke which is likely to overlap (and thus likely to crush a character) impairs visibility of a character. The device also registers in a font datum a piece of lower limit information described below for each character.

(2) Since both a thickness of a line drawn by the laser irradiation device and a character size are known prior to drawing a character, the laser irradiation device decides whether or not to use the small-sized font datum for each character based on both the line thickness and the character size. The less the number of omitted strokes becomes, the less the decrease of an amount of information of a character becomes. Thus, the device uses the standard font datum whenever possible. The laser irradiation device switches to the small-sized font datum only if the device has to use the small-sized font datum.

The device can choose an appropriate font datum by deciding whether or not to use the small-sized font datum based not only on the character size but also on a character thickness.

Although the laser irradiation device is targeted at a character in the following description, the laser irradiation device can draw line images as far as the line images are drawable by combination of strokes. The characters include numbers, symbols such as "!, $, %, &, ?", pictogram, and emoticons.

Although the present embodiment has illustrated the case of a drawing by a laser as an example, the present embodiment can employ a drawing by a hot air or a cold air, or a drawing by an electron beam or a radiation beam on a medium which reacts with these beams. Although the drawing by the laser can be achieved contactlessly, the present embodiment can draw while bringing a probe (a stylus) or the like into contact with a thermal rewritable medium 20 directly.

[Hardware Configuration Diagram of the Laser Irradiation Device]

FIG. 1 shows an example of a hardware configuration diagram of the laser irradiation device 200 of the present embodiment. Although the laser irradiation device 200 may also be referred to as a laser marker, there is no substantive difference between them.

The laser irradiation device 200 has a control device 100 configured to control over the whole, and a laser irradiating part 160 configured to generate a laser. The laser irradiating part 160 has a laser oscillator 11 configured to generate the laser, a direction control mirror 13 configured to change an irradiation direction of the laser, a direction control motor 12 configured to drive the direction control mirror 13, a spot diameter adjusting lens 14, and a focal distance adjusting lens 15.

The laser oscillator 11 is a laser diode (LD). The laser oscillator 11 may be a gas laser, a solid-state laser, a liquid laser, or the like. The direction control motor 12 is, for example, a servo motor configured to biaxially control a position of a reflection surface of the direction control mirror 13. The direction control motor 12 and the direction control mirror 13 make up a galvano mirror. The spot diameter adjusting lens 14 is a lens configured to magnify a spot diameter of a laser beam. The focal distance adjusting lens 15 is a lens configured to focus a laser beam and to adjust a focal distance.

The thermal rewritable medium 20 is a medium which forms a film in the state, for example, where leuco dyes and developers are separated, the thermal rewritable medium 20 makes color appear by combining the leuco dyes and the developer by applying heat to them at a predetermined temperature Ta and rapidly cooling them, and makes color disappear by restoring the state where the leuco dyes and the developers are separated by achieving a predetermined temperature Tb which is lower than the predetermined temperature Ta. The thermal rewritable medium 20 is, for example, a rewritable paper of heat sensitive type. In the present embodiment, although the device enables degradation control of such a thermal rewritable medium 20, the device can also be applied preferably to a medium such as a thermal paper which is not rewritable. Moreover, the laser irradiation device does not necessarily utilize heat for making color appear, the laser irradiation device may draw characters on a rewritable medium other than a thermal rewritable medium.

A laser beam generated by the laser oscillator 11 passes through the spot diameter adjusting lens 14 and its spot diameter is magnified. After a traveling direction is adjusted by the galvano mirror to a direction according to a shape of a character, the laser beam is focused by the focal distance adjusting lens 15 to a predetermined focal distance, and is sent toward the thermal rewritable medium 20. If the thermal rewritable medium 20 is irradiated with the laser beam, the thermal rewritable medium 20 is heated and makes color appear by the heat so that a character or the like is drawn. In this case, erasing power is not being used.

The control device 100 adjusts irradiated positions by driving the direction control motor 12 and moving the direction control mirror 13. The control device 100 switches a laser on and off and adjusts a laser power by controlling the laser oscillator 11. The control device 100 may also adjust a width of a stroke to be drawn by controlling the power or a position of the focal distance adjusting lens 15.

Figure 2:
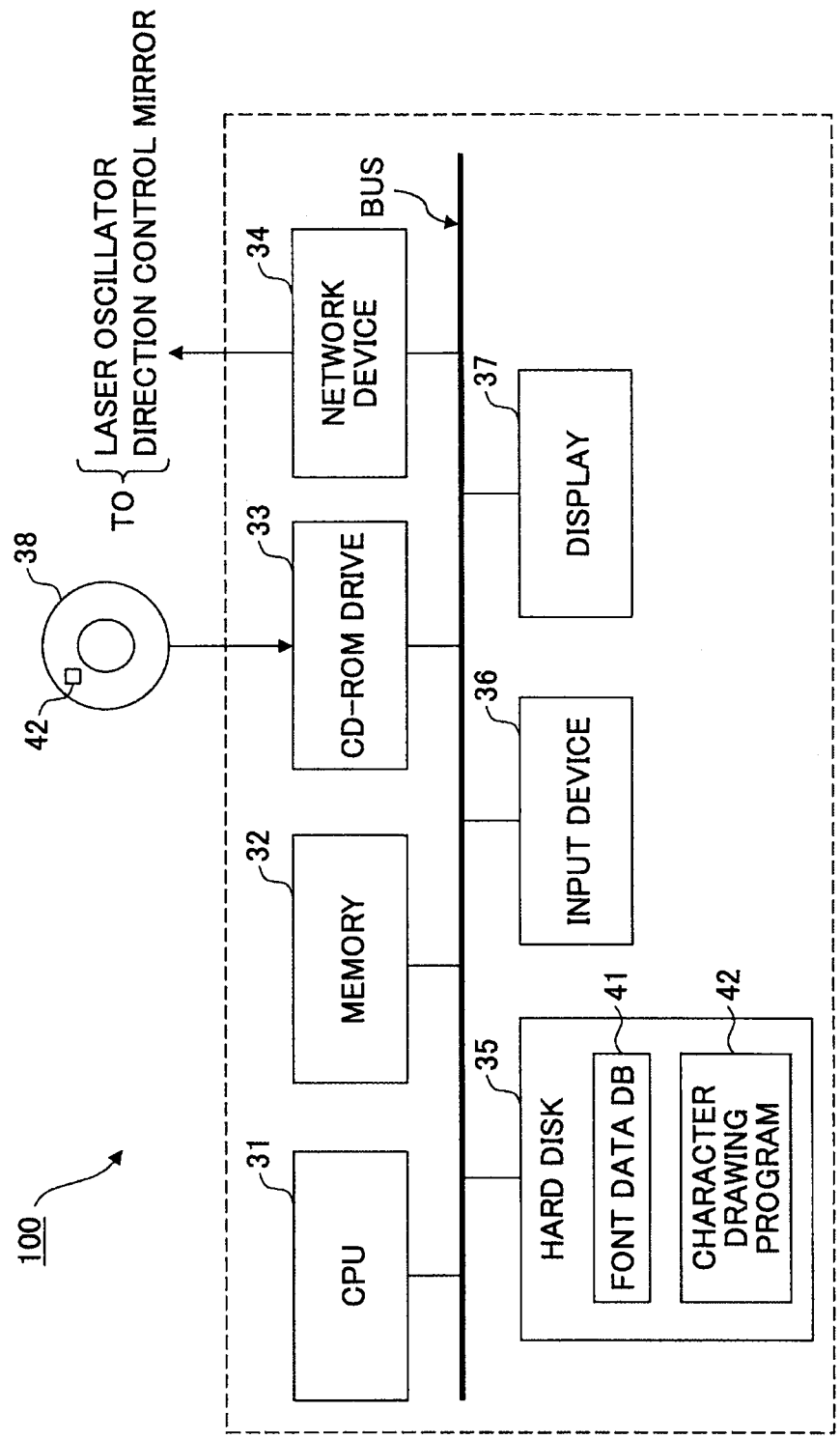
FIG. 2 is an example of a hardware configuration diagram of a control device.

FIG. 2 shows an example of a hardware configuration diagram of the control device 100. FIG. 2 is a hardware configuration diagram for the case of implementing the control device 100 by software and the control device 100 is materialized in the form of a computer. In the case of implementing the control device 100 without being materialized in the form of a computer, IC manufactured for a specific function such as ASIC (Application Specific Integrated Circuit) is used.

The control device 100 has a CPU 31, a memory 32, a hard disk 35, an input device 36, a CD-ROM drive 33, a display 37, and a network device 34. The hard disk 35 stores a font data DB 41 configured to store font data for each character of stroke fonts, and a character drawing program 42 configured to switch between the standard font datum and the small-sized font datum in the font data, generate a piece of drawing instruction, and control the laser irradiating part 160.

The font data DB 41 registers both the standard font datum and the small-sized font datum for each character. However, it is not necessary to have two kinds of font data for all characters. Simple characters such as the character in FIG. 16A, the character in FIG. 16B, or the like may have only the standard font datum. The standard font datum represents a font datum which a stroke is not omitted.

The CPU 31 reads out the character drawing program 42 from the hard disk 35, executes it, and draws a character on the thermal rewritable medium 20 according to the following procedure. The memory 32 is a volatile memory such as DRAM and becomes a working area for the CPU 31 to execute the character drawing program 42. The input device 36 is a device such as a mouse or a keyboard, configured for a user to input an instruction for controlling the laser irradiating part 160. The display 37, for example, provides GUI (Graphical User Interface) with a predetermined resolution and color number, based on a piece of screen information indicated by the character drawing program 42. The display 37, for example, shows an entry field for a character to be drawn on the thermal rewritable medium 20.

The CD-ROM drive 33 is configured to receive CD-ROM 38 exchangeably and read out data from the CD-ROM 38. The CD-ROM drive 33 is also used to write data in a recordable storage medium. The character drawing program 42 and the font data DB 41 are recorded in the CD-ROM 38 and distributed, and are read out and installed from the CD-ROM 38 into the hard disk 35. A non-volatile storage medium such as a DVD, a Blu-ray Disc, a SD card, a memory stick (registered trademark), a multimedia card, a xD card, or the like can be used instead of the CD-ROM 38.

The network device 34 is an interface such as an Ethernet (registered trademark) card configured to be connected to a network such as LAN or Internet. The network device 34 can send a drawing instruction in accordance with a character code to the laser irradiating part 160 by executing processes in accordance with a protocol defined in a physical layer and a data link layer of OSI basic reference model. The character drawing program 42 and the font data DB 41 are downloadable from a predetermined server connected through the network. The control device 100 and the laser irradiating part 160 may be directly connected through a USB (Universal Serial Bus), an IEEE1394, a wireless USB, a Bluetooth, or the like, instead of the network.

Targeted characters to be drawn on the thermal rewritable medium 20 are either being stored in the hard disk 35 in the form of list or entered from the input device 36. A character is specified by a character code such as a UNICODE or a JIS code. The control device 100 reads out a font datum for a character corresponding to a character code from the font data DB 41 and controls the laser irradiating part 160 by converting the font datum into a drawing instruction.

[Font Data of Stroke Fonts]

This section explains about font data used for drawing stroke fonts by a laser beam in a straightforward way.

Figures 3A, 3B, 3C, 3D:
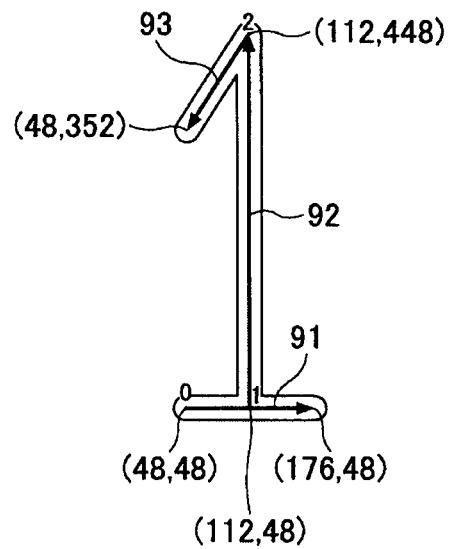
FIG. 3A is an example of a font datum.
FIG. 3B is an example of a font datum.
FIG. 3C is an example of a drawing instruction.
FIG. 3D is an example of a drawing sample.

FIG. 3A shows an example of a font datum. The font datum in FIG. 3A is a font datum for a character "1". The character "1" is an example of a character defined by strokes (the stroke may be either a straight line or a curved line). A font datum for a stroke font is comprises of combinations of coordinates of strokes corresponding to each stroke or each straight part of a character. The font datum has coordinates of end points of each stroke and an order of each stroke. In the case where the character is allocated on a bitmap, the coordinates are designated with their origin at a predetermined pixel of the bitmap.

If the laser irradiation device draws a stroke font by a laser or the like, the laser irradiation device can not decide whether to move with generating a laser or to move without generating a laser, based only on the coordinates. For this reason, a font datum of a stroke font includes a laser drawing start position (a pen feeding position in the case of handwriting) and a move instruction, or a laser drawing end position (a pen lifting position in the case of handwriting) and a move instruction. In FIG. 3A, "m" represents a laser drawing start position and a move instruction to a next coordinate, and "d" represents a laser drawing end position and a move instruction to a next coordinate, respectively. Therefore, "m" means movement with a pen up and "d" means movement with a pen down. In this way, the font datum defines by coordinates a character shape, an order of drawing, and a direction of drawing (a stroke with arrow in FIG. 3D), and defines by "m" and "d" whether a laser irradiation is required or not.

Therefore, in the case of the font data shown in the figure, the laser irradiation device moves the direction control mirror 13 while generating a laser for drawing a stroke from a coordinate (24, 24) to a coordinate (88, 24), moves the mirror 13 without generating a laser from a coordinate (88, 24) to a coordinate (56, 24), moves the mirror 13 while generating a laser from a coordinate (56, 24) to a coordinate (56, 224), and then moves the mirror 13 while generating a laser from a coordinate (56, 224) to a coordinate (24, 176).

A stroke font is a kind of scalable font such as an outline font. Thus, it is possible to specify a character size when the character is drawn on the thermal rewritable medium 20 for example. In FIG. 3B, the character size is doubled based on the font datum. Although several methods for adjusting a character size in a stroke font are known, here in this specification, each coordinate of the font datum is simply doubled for illustrative purposes. The coordinates of the stroke can be adjusted depending on a distance from a center of a character for example. The small-sized font data is omitted.

The order of the stroke to be drawn is indicated in brackets "[ ]" of FIG. 3B. This order is decided in the order of address of each stroke in the font datum of FIG. 3A for example.

FIG. 3C shows an example of a drawing instruction. "m" and "d" are the same control code as those in FIG. 3A. "t" represents a character thickness, "w" represents a waiting time before starting drawing (a control code for stabilizing a drawing by waiting for a complete stop of the direction control mirror 13 activated). "w" has a predetermined fixed value suitable for the laser irradiating part 160, which is based on a millisecond, a microsecond, or a unit time unique to the laser irradiating part 160.

FIG. 3D shows an example of a character drawn by using a font datum for a laser. Line segments 91-93 correspond to trajectories which the center of the laser beam has passed through and directions of arrows indicate directions of drawings. Areas surrounding arrows correspond to (chromogenic) portions drawn by the laser beam. Widths of the areas surrounding arrows indicate the character thickness. In addition, each number (0, 1, 2) marked in the character indicates the order of drawing for each of the line segments 91-93. FIG. 3D depicts the character "1" with the thickness obtained depending on the laser power and the focal position of the focal distance adjusting lens 15.

[Font Datum of a Stroke Font with Overlaps Removed]

FIG. 4 shows a drawing example of a character with overlaps removed and an example of a corresponding drawing instruction. In the character "1" shown in FIG. 3, two strokes overlap at coordinate (112, 48). There is also a turn-round at coordinate (112, 448). Hereinafter, both are simply called "overlap" or "overlap portion" without distinction. Since the overlap portion is an area which is scanned by a laser beam several times, there is a possibility that the thermal rewritable medium 20 becomes overheated. Thus, as shown in FIG. 4, it is preferable to draw the character by using a font datum with overlaps removed. A method for generating a font datum with overlaps removed is described in detail in JP2008-208631A for example. Alternatively, a font datum with overlaps removed may be prepared in advance.

The character "1" in FIG. 4 is comprised of three line segments. The line segment 91 is divided into line segments 91a, 91b at an intersection (112, 48). The line segment 93 is shortened to be line segment 93a at a turn-round point (112, 448). Thus, as a consequence of the fact that the overlaps are removed, the number of line segments has become four.

Figures 4A, 4B, 4C, 4D:
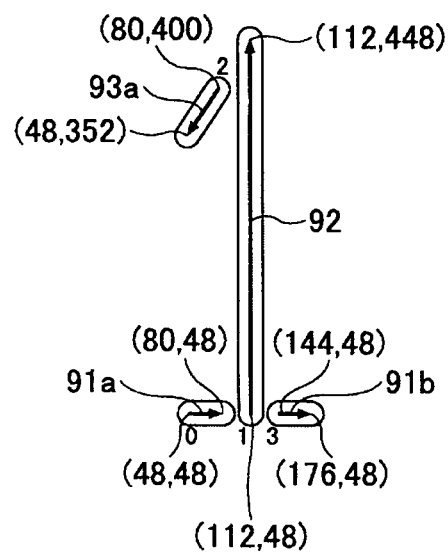
FIG. 4A is an example of a font datum of a character with overlaps removed.
FIG. 4B is an example of a font datum of a character with overlaps removed.
FIG. 4C is an example of a drawing instruction of a character with overlaps removed.
FIG. 4D is an example of a drawing sample of a character with overlaps removed.

FIG. 4A is identical to FIG. 3B. FIG. 4B shows coordinates of the font datum with overlaps removed. A drawing instruction is generated from the font datum of FIG. 4B. In this way, once coordinates of line segments and the order of drawing are specified, a drawing instruction can be generated by associating "m" and "d" illustrated in FIG. 3 with the coordinates.

FIG. 4C shows an example of a drawing instruction and FIG. 4D shows a drawing example. In FIG. 4C, "m", "d", "t", and "w" are the same control code as those in FIG. 3C. According to FIG. 4C, a drawing instruction starts with "m 48 48", "w 50" so that the laser irradiation device 200 at first moves the direction control mirror 13 without generating a laser for the focal position to reach the coordinate (48, 48) and then waits for a predetermined duration "w 50".

Next, the drawing instruction continues "d 80 48", "m 112 48", "w 50" so that the laser irradiation device 200 moves the direction control mirror 13 while generating a laser for drawing from the coordinate (48, 48) to the coordinate (80, 48), and then moves the mirror 13 without generating a laser for moving the focal position to the coordinate (112, 48), and then waits for a predetermined duration "w 50".

Next, the drawing instruction continues "d 112 448", "m 80 400", "w 50" so that the laser irradiation device 200 moves the direction control mirror 13 while generating a laser for drawing from the coordinate (112, 48) to the coordinate (112, 448), and then moves the mirror 13 without generating a laser for moving the focal position to the coordinate (112, 448).

Next, the drawing instruction continues "d 48 352", "m 144 48", "w 50" so that the laser irradiation device 200 moves the direction control mirror 13 while generating a laser for drawing from the coordinate (80, 400) to the coordinate (48, 352), and then moves the mirror 13 without generating a laser for moving the focal position to the coordinate (144, 48).

Next, the drawing instruction continues "d 176 48" so that the laser irradiation device 200 moves the direction control mirror 13 while generating a laser for drawing from the coordinate (144, 48) to the coordinate (176, 48) and terminates.

According to the above described drawing instructions, the laser irradiation device can draw a character without overlaps in the minimum time.

The present embodiment has explained about the aspect targeted at a character including overlaps. However, since the laser irradiation device 200 can generate from the small-sized font datum the font datum with overlaps removed, it is possible, whether with or without removal of overlaps, to use switching of font data.

[Switching of Font Data]

Hereinafter, switching of font data is described.

Figure 5:
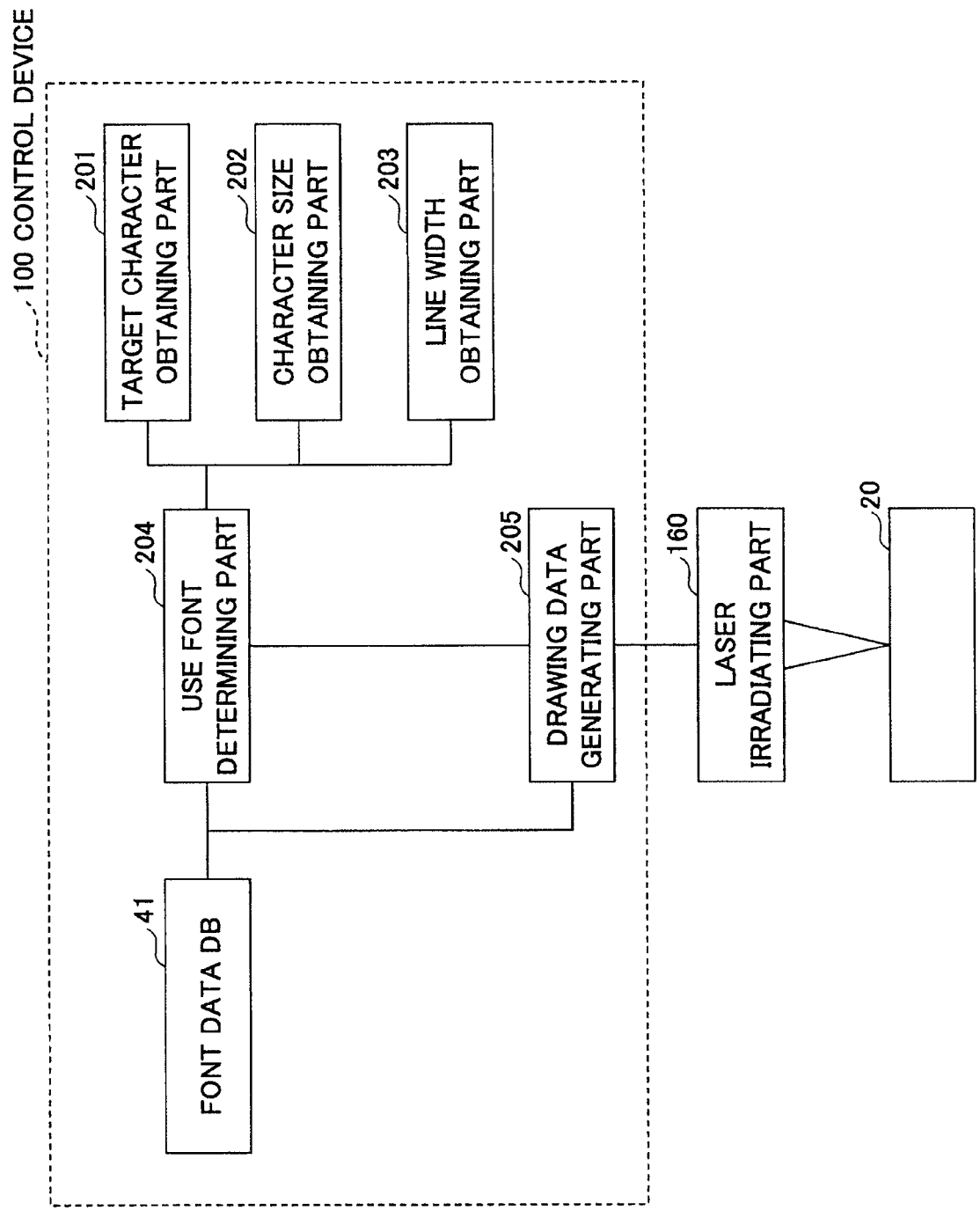
FIG. 5 is an example of a function block diagram of a laser irradiation device.

FIG. 5 shows an example of a function block diagram of a laser irradiation device 200. The control device 100 has a target character obtaining part 201, a character size obtaining part 202, a line width obtaining part 203, a use font determining part 204, and a drawing data generating part 205. In the case of implementing each block with software, the CPU 31 executes the character drawing program 42 so that each block is implemented. The control device stores font data in the font data DB 41.

Figure 6:
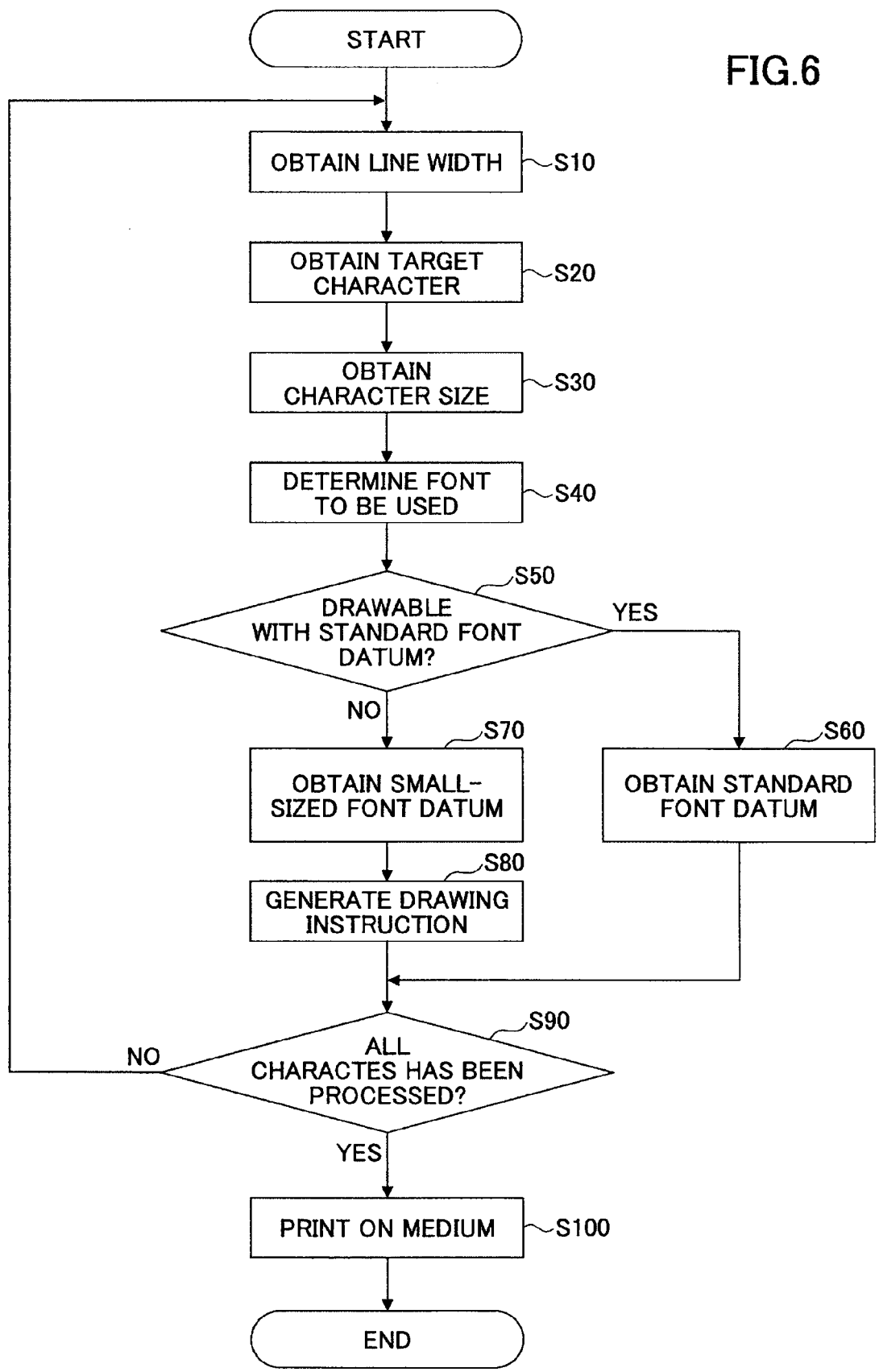
FIG. 6 is an example of a flow chart showing a procedure in which a laser irradiation device selects a font datum and draws a character.

Hereinafter, each function is described based on a flow chart of FIG. 6. FIG. 6 shows an example of a flow chart illustrating a procedure in which the laser irradiation device 200 draws a character by choosing a font datum. The flow chart of FIG. 6 starts with a process where a user enters from the input device 36 an instruction for the laser irradiation device 200 to draw a character.

[S10: Obtaining a Character Thickness]

At first, the line width obtaining part 203 obtains a thickness of a character (stroke) to be drawn. A character thickness depends on a diameter of a laser beam with which the laser irradiating part 160 irradiates the thermal rewritable medium 20. The diameter of the laser beam is variable depending on a lens constitution in an optical path from a laser source, a distance to the thermal rewritable medium 20, and a laser power. In the present embodiment, a correspondence relation between a line thickness and a parameter which decides a diameter of a laser beam is calibrated in advance. Thus, the user can enter from the input device 36 a character thickness within a predetermined range (for example, between 0.1 mm and 1 mm).

[S20: Obtaining a Character Code of a Target Character to be Drawn]

Next, the target character obtaining part obtains a character code of a target character to be drawn. The target character to be drawn is designated by the user. The character code of the target character to be drawn is entered from the input device 36 or is stored in the hard disk 35 in advance (including the case where it is entered through a network). The character code of the target character to be drawn is a character code corresponding to a key code entered by pressing down a key on a keyboard for the case of being entered from the input device 36, or a character code converted from a key code by an IME (Input Method Editor) for the case where the IME is running. In the case where a character code is stored in the hard disk 35 in advance, since a string such as an address is stored in a list form, the target character obtaining part 201 sequentially reads out each character code for each character in the string from the hard disk 35.

[S30: Obtaining a Character Size]

Next, the character size obtaining part 202 obtains a size of a character to be drawn for each character individually or for all characters commonly. The user enters the character size from the input device 36. The user can designate the size in millimeters, in points, or the like. The user can designate a numerical value or can choose from a plurality of sizes. As described above, the control device 100 can obtain a character thickness, a character code, and a character size. The control device 100 stores the obtained character thickness, the obtained character code, and the obtained character size in the memory 32 for example. A character thickness, a character code, and a character size are obtained in random order.

[S40: Decision of Font Datum to be Used]

Next, the use font determining part 204 determines a font datum to be used for each character based on the obtained size and thickness of the character.

Figure 7:
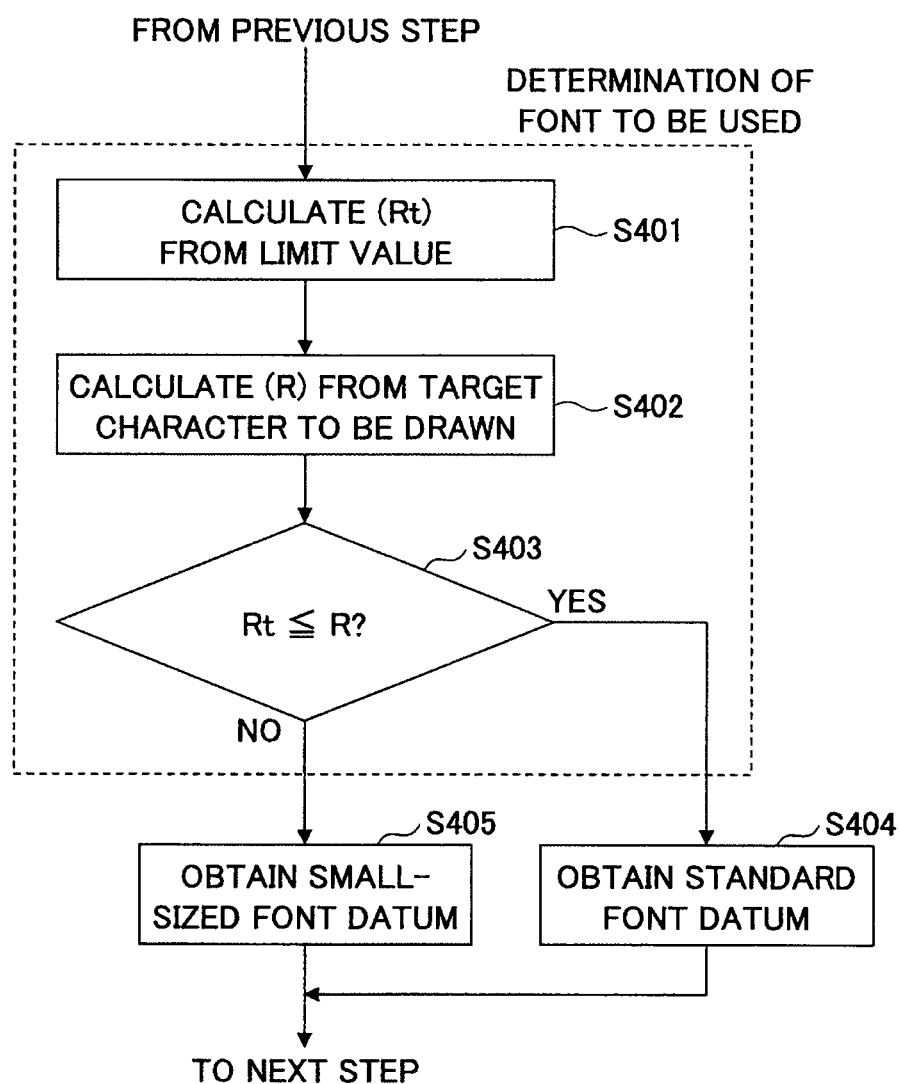
FIG. 7 is an example of a flow chart showing a process of a step S40 in FIG. 6 in detail.

FIG. 7 is an example of a flow chart for illustrating a process of the step S40 in more detail.

In the font data DB 41, the lower limit of a character size in relation to a thickness of the character which the standard font datum can represent is defined for each character in advance. For example, a piece of information such as the fact that, with regard to the Chinese character in FIG. 16C, if the character thickness is 0.3 millimeter, the laser irradiation device 200 uses the standard font datum as far as the character size is more than or equal to 1.5 millimeters square (hereinafter called "lower limit information") is stored in the font data DB 41. A piece of the lower limit information may be associated with one character, or more than two pieces of the lower limit information may be associated with one character.

Simple shaped characters can be drawn with the standard font datum down to smaller sizes. By contrast, complicated shaped characters such as the character in FIG. 16D, the character in FIG. 16E, or the like become unreadable because it is impossible to maintain a gap between strokes unless the characters have larger sizes. Thus, given that a character thickness in the lower limit information is common in each character, a character size in the lower limit information for the simple shaped characters becomes smaller, while a character size in the lower limit information for the complicated shaped characters becomes larger. Since a character thickness is often common in each character, a character thickness in the lower limit information is often common in each character, too.

The lower limit information becomes apparent empirically by drawing a character by using a laser beam with a certain character thickness while changing the character size.

Figure 8:
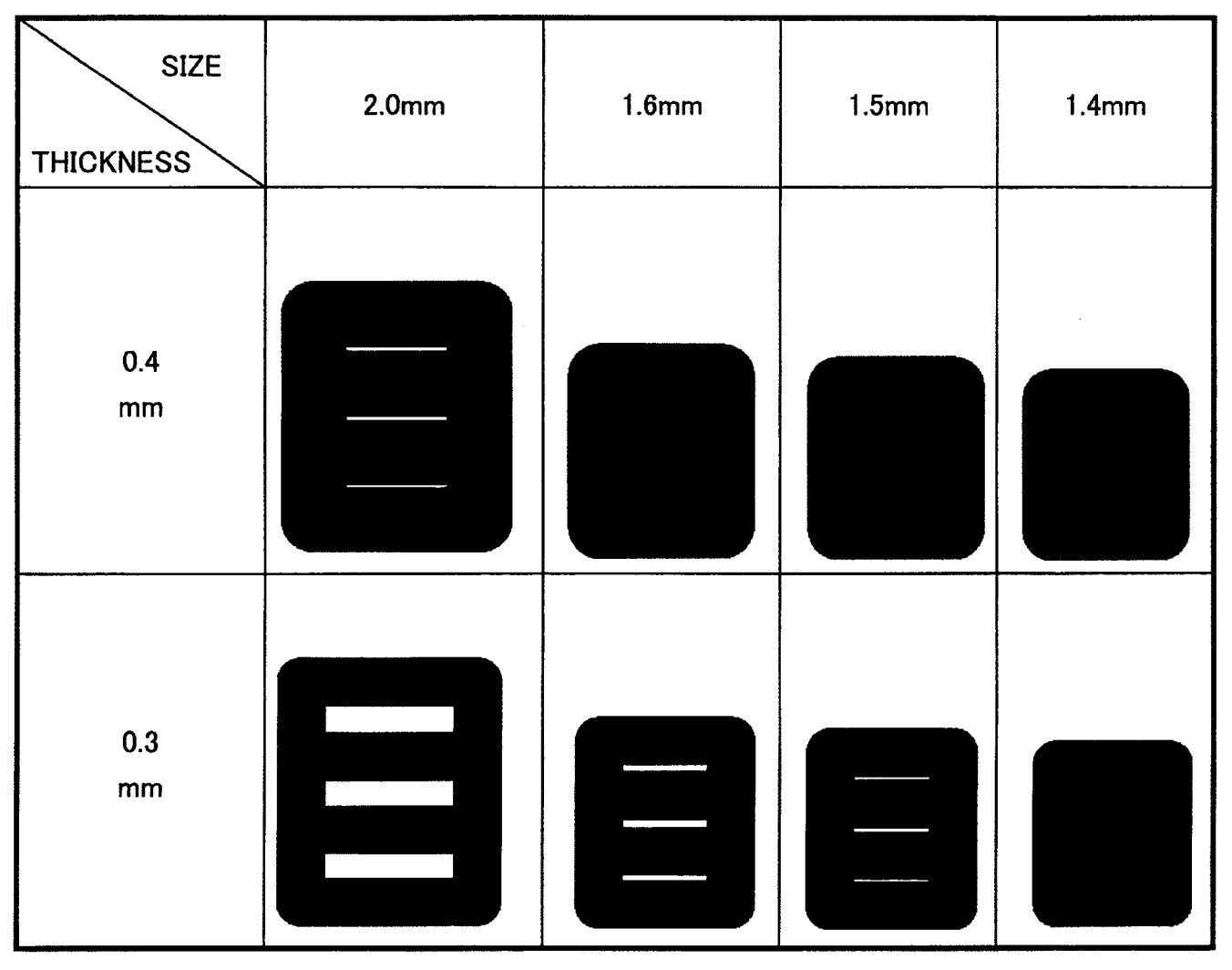

FIG. 8 is an example of a figure showing the decision of the lower limit information diagrammatically. FIG. 8 shows drawing examples of various sizes of the Chinese character in FIG. 16C in the case of character thickness 0.4 mm and in the case of character thickness 0.3 mm, respectively. The figure shows four character sizes of 2.0 millimeters square, 1.6 millimeters square, 1.5 millimeters square, and 1.4 millimeter square.

In the case of the character thickness 0.3 mm, although the character is barely discernible if the size is more than or equal to 1.5 millimeter square, the character becomes unreadable if the size is less than or equal to 1.4 millimeter square because it is impossible to maintain a gap between strokes. Thus, the lower limit information for the Chinese character in FIG. 16C becomes "a character size 1.5 mm for a character thickness 0.3 mm".

In the case of the character thickness 0.4 mm, although the character is barely discernible if the size is more than or equal to 2.0 millimeter square, the character becomes unreadable if the size is less than or equal to 1.6 millimeter square because it is impossible to maintain a gap between strokes. Thus, the lower limit information for the Chinese character in FIG. 16C becomes "a character size 2.0 mm for a character thickness 0.4 mm".

A gap (clearance) between strokes is invisible to a naked eye unless the gap has a certain level of distance. Thus, the lower limit information can be decided while keeping on the safe side. For example, in the case of a line width 0.3 mm, the minimum character size can be set at from about 1.6 mm to 2.0 mm. In this way, it can be empirically decided for each character to which level the lower limit should be set.

The lower limit can be set by calculating the lower limit information based on a character size and a stroke count of a character (the number of strokes). Given that a character consists only of a horizontal line or a vertical line, the number of strokes which can be drawn while maintaining a gap between strokes can be estimated as follows.

The number of strokes which can be drawn while maintaining a gap between strokes=Character size÷Character thickness−1 (decimals omitted)

For example, if a character size is 2.0 mm and a thickness is 0.3 mm, the number of strokes becomes 5, and if a character size is 2.0 mm and a thickness is 0.4 mm, the number of strokes becomes 4.

Therefore, by modifying equation above, the relationship between a character thickness and a character size (the lower limit information) can be estimated.

Character size=Character thickness×(The number of strokes+1)

For example, if a character thickness is 0.3 mm and the number of strokes is 5 (the stroke count of the Chinese character in FIG. 16C), a character size becomes 1.8 mm. If a character thickness is 0.4 mm and the number of strokes is 5 (the stroke count of the Chinese character in FIG. 16C), a character size becomes 2.4 mm. Given that all the strokes are horizontal lines or vertical lines, the character size calculated by this equation enables almost all of characters to be drawn without making the characters unreadable. In addition, since the character size calculated by this equation tends to be on the large side, the character size can be corrected to be smaller by a corrective coefficient.

Referring back to the flow chart of FIG. 7, the use font determining part 204 calculates ratio (Rt) between a character size and a character thickness from the lower limit information (S401).

Ratio (Rt)=Character size÷Character thickness

If the definition of the lower limit information is "a character size 1.5 millimeters square at minimum for a character thickness 0.3 mm", it results "Ratio (Rt)=1.5÷0.3=5.0".

Next, the use font determining part 204 calculates ratio (R) from a size of a target character to be drawn and its thickness (S402).

Ratio (R)=The size of the target character÷The thickness of the target character Hereinafter, with regard to the Chinese character in FIG. 16C, in the case of the character thickness 0.4 mm, drawings with two character sizes 2.0 mm and 1.6 mm will be described. The ratios (R) in this case are as follows.

Ratio (R)=2.0÷0.4=5.0

Ratio (R)=1.6÷0.4=4.0

Ratios (R) and (Rt) have been introduced on the basis that a character size increases with increase in a character thickness. Thus, if the ratio (R) is more than or equal to the ratio (Rt), it is considered that the laser irradiation device 200 can draw the character without generating a crushed character. In this way, by comparing the ratio (R) and the ratio (Rt), the laser irradiation device can determine whether or not it can draw a character having the character thickness entered at a step S10 and the character size entered at a step S30 without generating a crushed character. As described above, the use font determining part 204 determines whether or not to use the standard font datum as follows (S403).

[S50~S70: Determination of Availability of the Standard Font Datum]

Referring back to a step S50 of FIG. 6, the use font determining part 204 determines whether to use the standard font datum or the small-sized font datum, depending on magnitude relation between (Rt) and (R).

In the case of (Rt)<(R), the use font determining part 204 uses the standard font datum.

In the case of (Rt)>(R), the use font determining part 204 uses the small-sized font datum.

Thus, in the case of (R)=5.0, since the condition (Rt)≤(R) is met, the use font determining part 204 determines that the use font determining part 204 uses the standard font datum. In the case of (R)=4.0, since the condition (Rt)>(R) is met, the use font determining part 204 determines that the use font determining part 204 uses the small-sized font datum.

In the case of (Rt)≤(R), the use font determining part 204 requires the drawing data generating part 205 to use the standard font datum. The drawing data generating part 205 reads out from the font data DB 41 the standard font datum for the Chinese character in FIG. 16C for example (S60).

In the case of (Rt)>(R), the use font determining part 204 requires the drawing data generating part 205 to use the small-sized font datum. The drawing data generating part 205 reads out from the font data DB 41 the small-sized font datum for the Chinese character in FIG. 16C for example (S70).

FIG. 9 is a diagram illustrating an example of the small-sized font datum. In FIG. 9, a character thickness is 0.4 mm. The small-sized font datum is a simplified font datum in which one or more lines are removed accordingly. The small-sized font datum is registered in the font data DB 41 in advance.

Figure 9A:
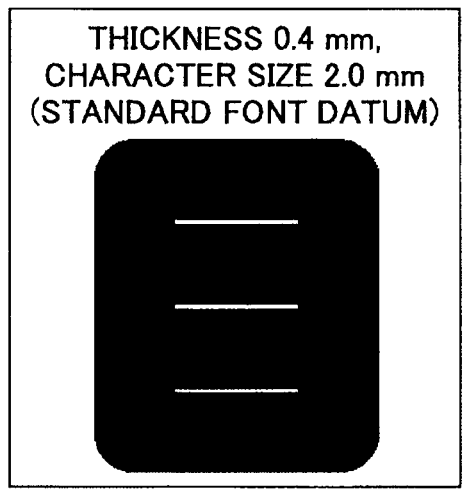
FIG. 9A is a diagram showing an example of a standard font datum.
Figure 9B:
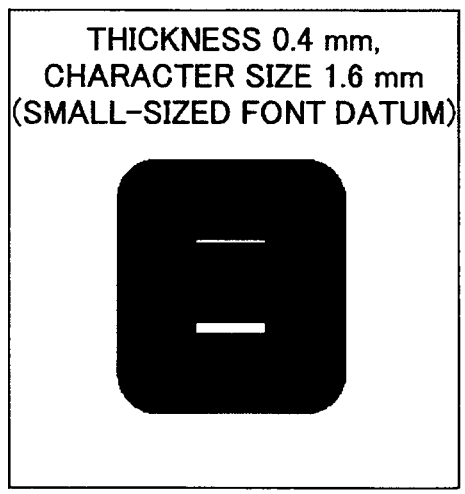
FIG. 9B is a diagram showing an example of a small-sized font datum.
Figure 9C:
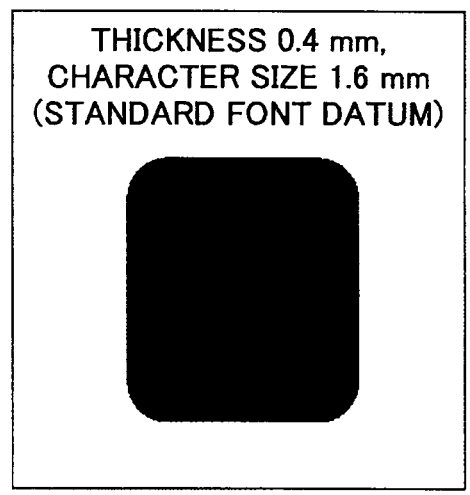
FIG. 9C is a diagram showing an example of another standard font datum.

FIG. 9A is the standard font datum for the Chinese character in FIG. 16C. FIG. 9B is the small-sized font datum for the Chinese character in FIG. 16C with a single transverse stroke removed. In FIG. 9B, although the character may be read as another Chinese character in FIG. 16F, if the character is a small character, considering prior and posterior context, the character can be read as the Chinese character in FIG. 16C. FIG. 9C is a drawing example of the Chinese character in FIG. 16C with the standard font datum. The drawing example has the same size as the one in FIG. 9B. As is clear from comparison between FIG. 9B and FIG. 9C, it shows that in the standard font datum, if the character size is small, the laser irradiation device 200 generates a crushed character, while the laser irradiation device 200 prevents the crushed character from generating by using the small-sized font datum.

[S80: Generation of a Drawing Datum]

Once a font datum is decided, the drawing data generating part 205 can generate a drawing instruction shown in FIG. 3C or FIG. 4C.

[S90]

The target character obtaining part 201 determines whether or not the above processes are completed for all the target characters to be drawn. In the case where the target characters to be drawn are entered from the input device 36, if, for example, the character code for a return key is detected, the target character obtaining part 201 determines that the above processes for all the target characters to be drawn are completed. In the case where a character thickness is fixed in the device, the device can perform repetitive processes from a step S20. In this case, the device can save time for obtaining the character thickness.

[S100]

The laser irradiating part 160 draws a character on the thermal rewritable medium 20 according to the drawing instruction. In this way, the flow chart of FIG. 6 terminates.

Since the laser irradiation device 200 of the present embodiment switches font data for each character based on a character thickness and a character size, the laser irradiation device 200 can draw both a large sized character and a small sized character with high visibility even if a thick line is used. In addition, the laser irradiation device 200 can prevent overheat of the thermal rewritable medium 20 by removing overlaps on a character.

<Second Embodiment>

Although a character often has a virtually square shape, the character may be laterally narrowed or may be longitudinally narrowed. For example, in the case of horizontal writing, a character may be narrowed only vertically due to the limitation of its vertical size, and in the case of vertical writing, a character may be narrowed only horizontally due to the limitation of its horizontal size. Conversely, in the case of horizontal writing, a character may be narrowed only horizontally due to the limitation of horizontal space, and in the case of vertical writing, a character may be narrowed only vertically due to the limitation of vertical space.

In the case of drawing a character such as the Chinese character in FIG. 16C, if a character size is narrowed vertically, horizontal lines tend to overlap each other because the character has as many as four horizontal lines. While, even if a character size is narrowed horizontally, vertical lines remain unaffected because the character has only two vertical lines.

Consequently, the present embodiment explains about the laser irradiation device 200 configured to set the vertical lower limit information and the horizontal lower limit information separately and to determine whether or not to use the standard font datum for each of a vertical direction and a horizontal direction. The laser irradiation device 200 of the present embodiment can selectively use the standard font datum and the small-sized font datum adequately even if a character is scaled in both a longitudinal direction and a transverse direction independently.

Hereinafter, the lower limit information of the present embodiment will be described. In the present embodiment, the laser irradiation device 200 stores both the vertical lower limit information and the horizontal lower limit information in the font data DB 41 for each character in advance. The lower limit information becomes apparent empirically by drawing a character by using a laser beam with a certain character thickness while changing a vertical character size and a horizontal character size, as in the first embodiment.

For example, in the case of a certain character, it is assumed that a character thickness is 0.3 mm, the lower limit of a character height is 3.0 mm, and the lower limit of a character width is 2.0 mm. In the lower limit information of the present embodiment, a single character thickness is associated with both a vertical lower limit and a horizontal lower limit of a character size. And in the present embodiment, the laser irradiation device 200 uses the standard font datum if it can draw a character without crushing the character both vertically and horizontally.

The function block diagram and the flow chart of the present embodiment are identical to those of the first embodiment. In the present embodiment, since only the step S40 where a font to be used is decided is different from the first embodiment, the step S40 will be described.

Figure 10:
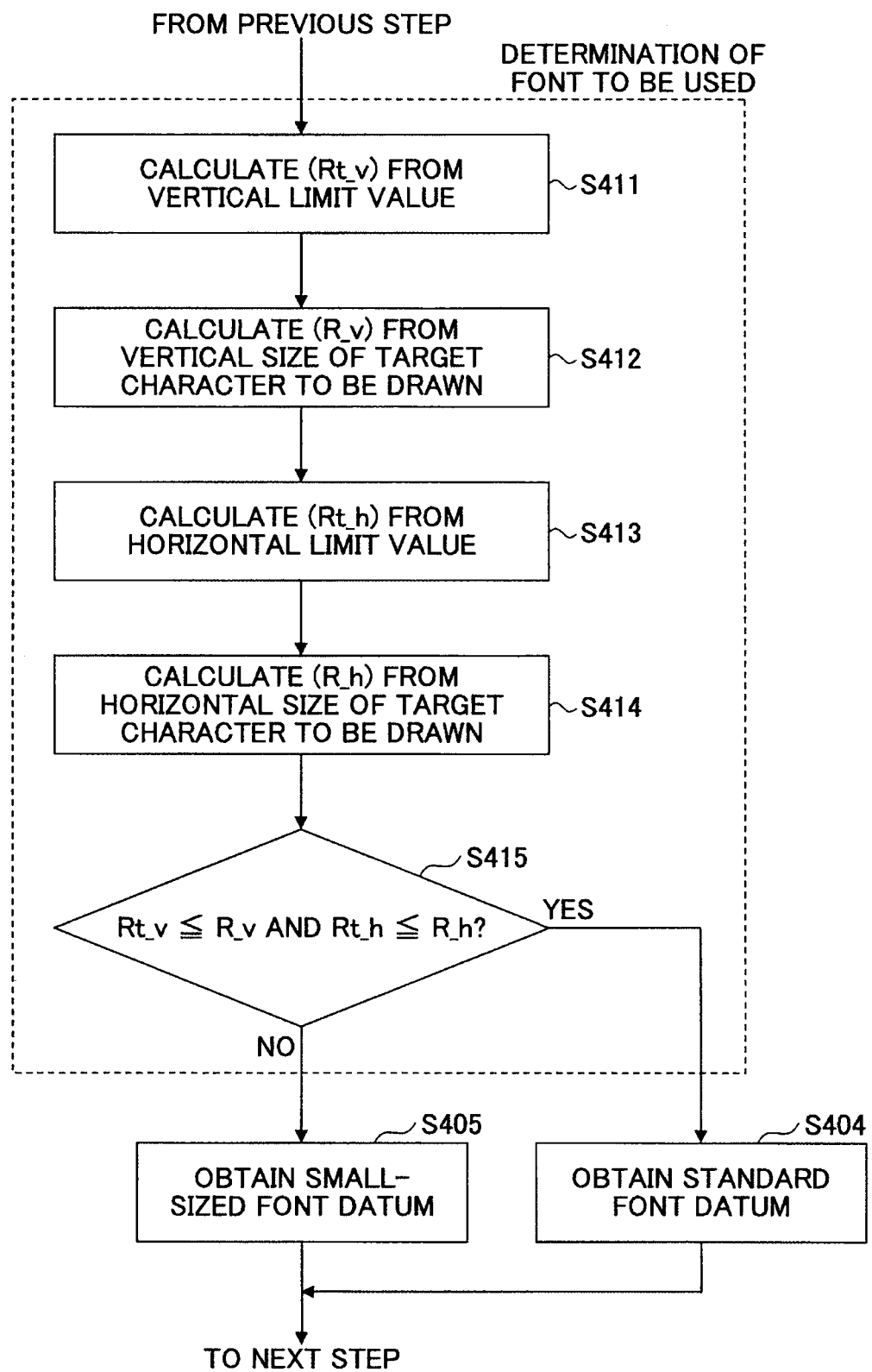
FIG. 10 is an example of a flowchart showing the step S40 in FIG. 6 in detail.

FIG. 10 is an example of a flow chart illustrating the step S40 of FIG. 6 in detail. At first, the use font determining part 204 calculates a ratio (Rt_v) from a vertical character size in the lower limit information and a character thickness (S411).

Ratio (Rt_*v*)=Vertical character size in the lower limit information÷Character thickness Next, the use font determining part 204 calculates a ratio (R_v) from a vertical size of a target character to be drawn (S412). The vertical size is entered by a user from the input device 36. The character size obtaining part 202 obtains the vertical character size from the input device 36.

Ratio (R_*v*)=Vertical size of a target character to be drawn÷Character thickness Next, the use font determining part 204 calculates a ratio (Rt_h) from a horizontal character size in the lower limit information and the character thickness (S413).

Ratio (Rt_*h*)=Horizontal character size in the lower limit information÷Character thickness Next, the use font determining part 204 calculates a ratio (R_h) from a horizontal size of a target character to be drawn (S414). The horizontal size of a target character to be drawn is entered by the user from the input device 36. The character size obtaining part 202 obtains the horizontal character size from the input device 36.

Ratio (R_*h*)=Horizontal size of a target character to be drawn÷Character thickness Then, the use font determining part 204 determines whether conditions Rt_v≤R_v and Rt_h≤R_h are met or not (S415). If the conditions in the step S415 are met, the laser irradiation device 200 can use the standard font datum for both in a vertical direction and a horizontal direction.

[S50~S70: Determination of Availability of the Standard Font Datum]

The use font determining part 204 determines to use the standard font datum if the conditions Rt_v≤R_v and Rt_h≤R_h are met. By contrast, the use font determining part 204 determines to use the small-sized font datum if the conditions Rt_v>R_v or Rt_h>R_h are met.

If the conditions Rt_v≤R_v and Rt_h≤R_h are met, the use font determining part 204 requires the drawing data generating part 205 to use the standard font datum. The drawing data generating part 205 reads out from the font data DB 41 the standard font datum for a character such as the Chinese character in FIG. 16C for example (S60).

By contrast, if the conditions Rt_v>R_v or Rt_h>R_h are met, the use font determining part 204 requires the drawing data generating part 205 to use the small-sized font datum. The drawing data generating part 205 reads out from the font data DB 41 the small-sized font datum for a character such as the Chinese character in FIG. 16C for example (S70). The subsequent processes are identical to those of the first embodiment.

The laser irradiation device 200 of the present embodiment can switch a font datum to be used appropriately even if a vertical character size is different from a horizontal character size because the laser irradiation device 200 determines whether there exists a crushed character or not for both a vertical direction and a horizontal direction.

Although the present embodiment has been described on the basis that there is only one small-sized font datum, the present embodiment may store a plurality of small-sized font data each of which corresponds to each of the cases where a vertical size is smaller than a horizontal size and where a horizontal size is smaller than a vertical size. In this way, the laser irradiation device 200 can selectively use the standard font datum and the small-sized font datum depending on the result of determining whether each of the conditions Rt_v≤R_v and Rt_h≤R_h is met or not.

FIG. 11 is an example of a diagram illustrating two small-sized font data. FIG. 11 shows the Chinese character in FIG. 16G as an example. FIG. 11A shows a standard font datum. FIG. 11B shows a small sized font datum for the case where a horizontal size does not comply with the lower limit information (for example, Rt or Rt_v). FIG. 11C shows a small sized font datum for the case where a vertical size does not comply with the lower limit information (for example, Rt or Rt_h). FIG. 11D shows a small sized font datum for the case where both a vertical size and a horizontal size do not comply with the lower limit information (for example, Rt, Rt_v, or Rt_h).

Figure 11A:
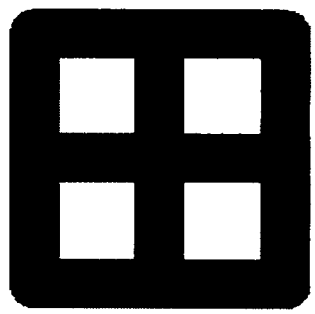
FIG. 11A is an example of a diagram showing a standard font datum.
Figure 11B:
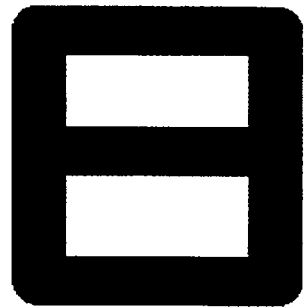
FIG. 11B is an example of a diagram showing a small-sized font datum.
Figure 11C:
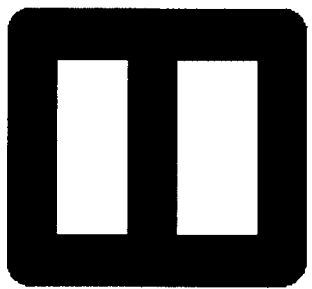
FIG. 11C is an example of a diagram showing another small-sized font datum.
Figure 11D:
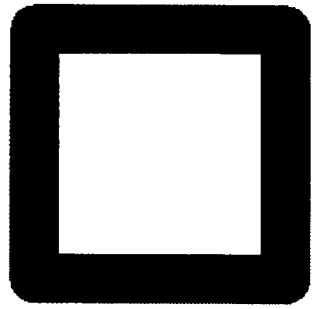
FIG. 11D is an example of a diagram showing yet another small-sized font datum.

In FIG. 11B, a vertical stroke of the Chinese character in FIG. 16G is omitted. In FIG. 11C, a horizontal stroke of the Chinese character in FIG. 16G is omitted. In FIG. 11D, both the vertical stroke and the horizontal stroke of the Chinese character in FIG. 16G are omitted.

In the case where such font data are prepared in advance, the use font determining part 204 can determine a font datum to be used as follows depending on the result of determination in the step S415.

(1) In the case where the conditions Rt_v R_v and Rt_h≤R_h are met (a character is not crushed either laterally or longitudinally), the use font determining part 204 determines to use the standard font datum in FIG. 11A.

(2) In the case where the conditions Rt_v≤R_v and Rt_h>R_h are met (a character is narrowed laterally and is likely to be crushed), the use font determining part 204 determines to use the small-sized font datum in FIG. 11B.

(3) In the case where the conditions Rt_v>R_v and Rt_h≤R_h are met (a character is narrowed longitudinally and is likely to be crushed), the use font determining part 204 determines to use the small-sized font datum in FIG. 11C.

(4) In the case where the conditions Rt_v>R_v and Rt_h>R_h are met (a character is narrowed both laterally and longitudinally), the use font determining part 204 determines to use the small-sized font datum in FIG. 11D.

In this way, the laser irradiation device 200 can switch font data to be used appropriately even if a vertical character size is different from a horizontal character size by preparing in advance each of the small-sized font datum for the case where the vertical size is small, the small-sized font datum for the case where the horizontal size is small, and the small-sized font datum for the case where both the vertical size and the horizontal size are small.

<Third Embodiment>

With regard to a character with a complicated shape, the laser irradiation device 200 can draw the character with high discriminability and high visibility in accordance with a character size by omitting a stroke adequately depending on a character size. Thus, it is preferable to prepare a plurality of small-sized font data in advance for some characters. Specifically, it is preferable to prepare small-sized font data broken up into several levels and to associate the lower limit information with each level. The use font determining part 204 calculates the ratio (Rt) from the lower limit information and selects the largest available small-sized font datum depending on a size of a target character to be drawn and a character thickness.

The function block diagram and the flow chart of the present embodiment are identical to those of the first embodiment. In the present embodiment, since only the step S40 where a font to be used is decided is different from the first embodiment, the step S40 will be described.

Figure 12:
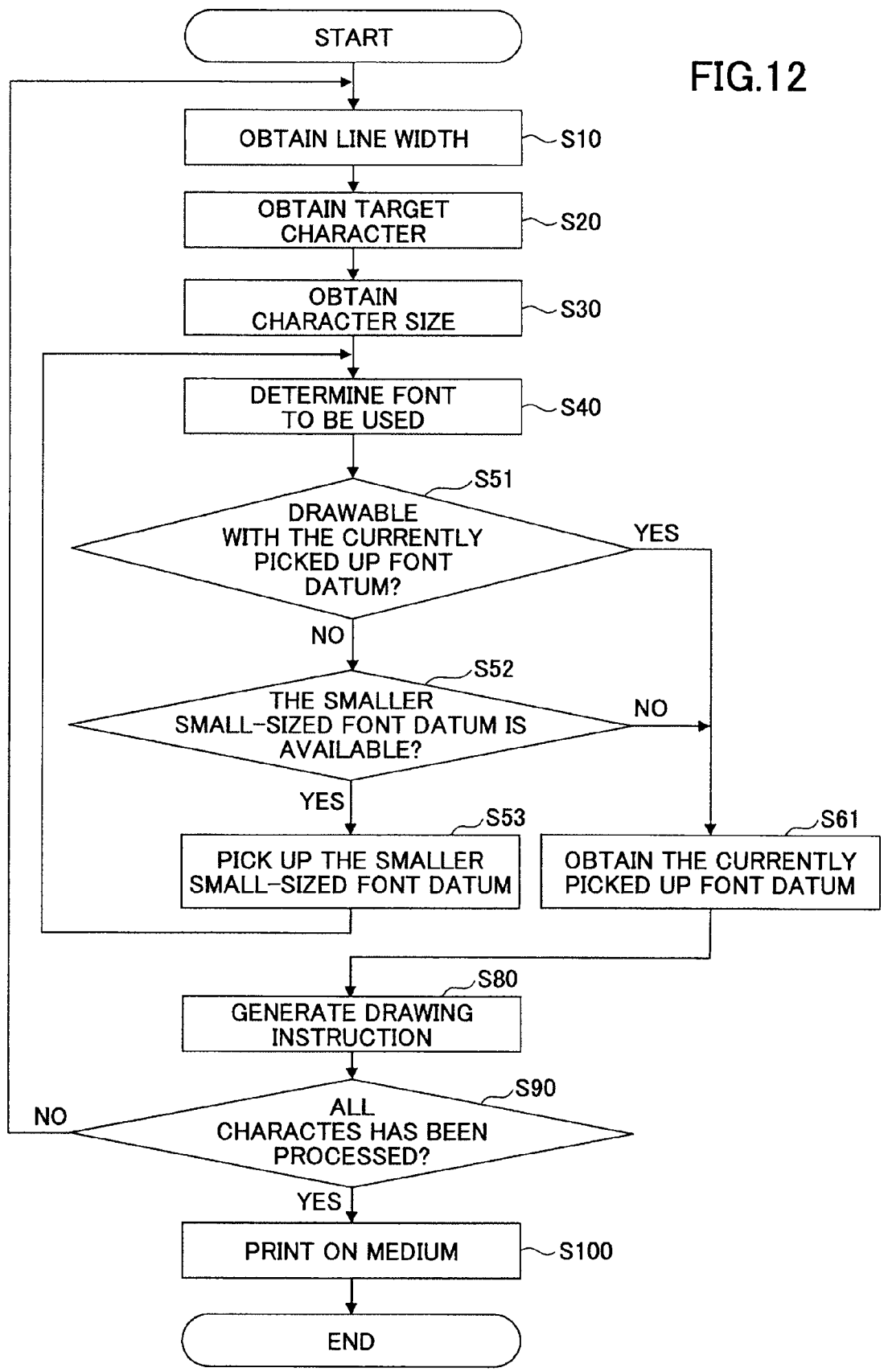
FIG. 12 is an example of a flow chart showing a procedure for selecting a font datum.

FIG. 12 is an example of a flow chart illustrating a procedure for selecting a font datum. In FIG. 12, the same step as the step in FIG. 6 has the same reference sign and its explanation is omitted.

The line width obtaining part 203 obtains a character thickness (S10). The target character obtaining part 201 obtains a character code of a target character to be drawn (S20). The character size obtaining part 202 obtains a character size, respectively (S30).

Then, the use font determining part 204 determines a font datum to be used (S40). Specifically, the use font determining part 204 picks up a font datum for a target character to be drawn. The use font determining part 204 at first picks up a font datum with larger size and later picks up a font datum with smaller size step by step. Thus, the use font determining part 204 initially picks up the standard font datum.

The use font determining part 204 calculates the ratio (Rt) from the lower limit information of the font datum, and calculates the ratio (R) from a character thickness and a character size obtained for the target character to be drawn as in the first embodiment.

Then, the use font determining part 204 compares the ratio (R) with the ratio (Rt), and determines whether the laser irradiation device 200 can draw the target character by using the picked up font datum (S51). If the laser irradiation device 200 can draw the target character by using the picked up font datum (YES in S51), the use font determining part 204 requires the drawing data generating part 205 to use the currently picked up font datum (S61).

If the laser irradiation device 200 can not draw the target character by using the picked up font datum (NO in S51), the use font determining part 204 determines whether there is a smaller small-sized font datum registered (S52).

If there is a smaller small-sized font datum registered (YES in S52), the use font determining part 204 reads out the smaller small-sized font datum from the font data DB41 (S53). Then, the laser irradiation device 200 repeats processes which follow the step S40.

If there is no smaller small-sized font datum registered (NO in S52), the use font determining part 204 requires the drawing data generating part 205 to use the currently picked up font datum (S61). In this case (where a smaller small-sized font datum is not available), there is no font datum which enable the laser irradiation device 200 to draw the target character without a overlap of strokes of the target character. However, the drawing data generating part 205 generates a drawing instruction from the currently picked up font datum because it is better than nothing.

The present embodiment can draw the target character with an optimal font datum in accordance with a character size by preparing a plurality of small-sized font data broken up into several levels. For example, if only the smallest small-sized font datum were prepared, since the laser irradiation device 200 has to draw the target character with the highly simplified font datum (the smallest small-sized font datum) in spite of the fact that a character size is relatively large, the laser irradiation device 200 would reduce visibility. The present embodiment can prevent such a disadvantage.

<Fourth Embodiment>

Although the laser irradiation device 200 draws a character independently in the first embodiment, the laser irradiation device 200 can be implemented as a system.

Figure 13:
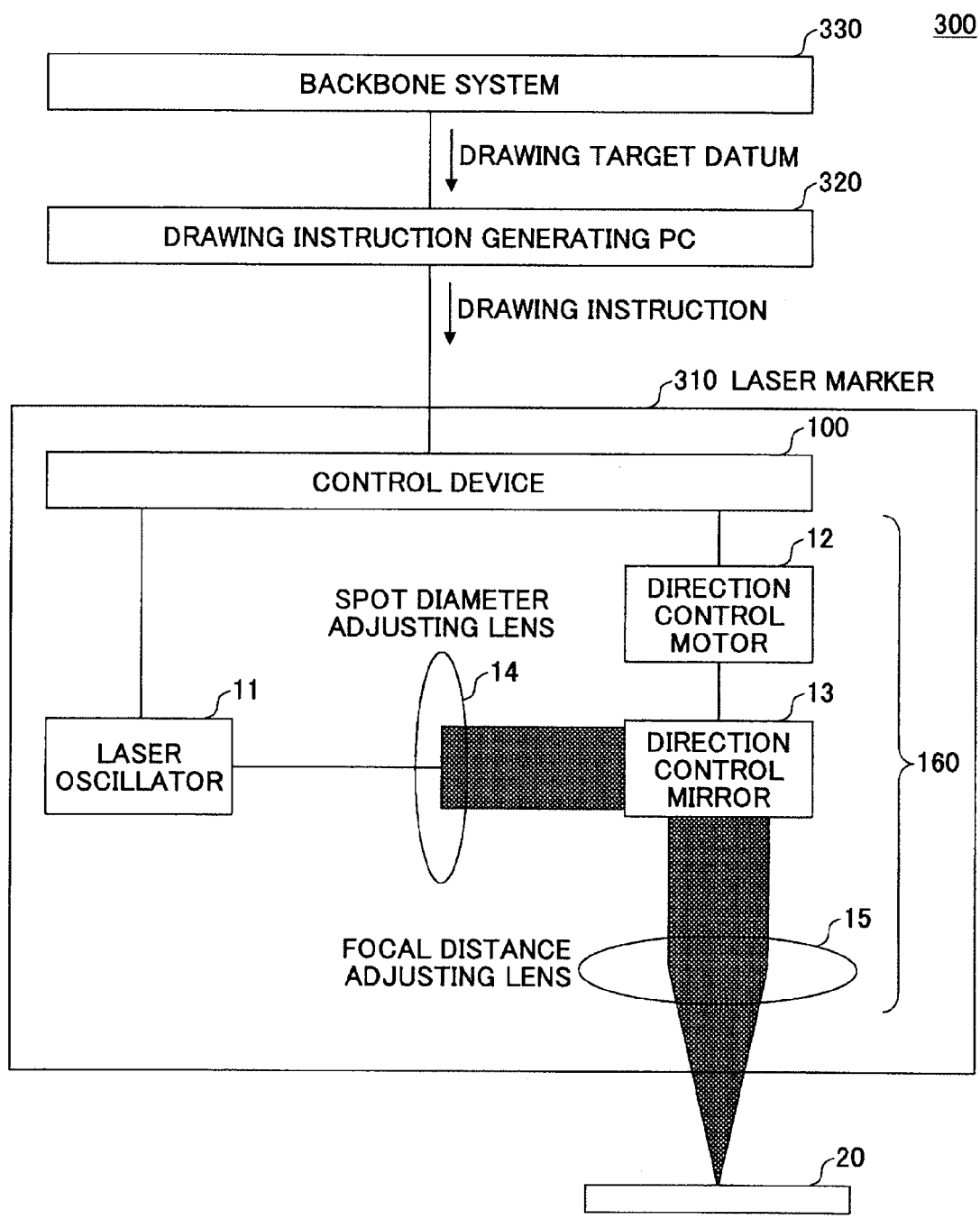
FIG. 13 is an example of a hardware configuration diagram of a laser irradiation device (a fourth embodiment).

FIG. 13 shows an example of a hardware configuration diagram of a laser irradiation device 300 of the present embodiment. In FIG. 13, the same element as the element in FIG. 1 has the same reference sign and its explanation is omitted. A backbone system 330 and a drawing instruction generating PC 320 are connected through a network or a dedicated line. The drawing instruction generating PC 320 and the control device 100 are connected through a network or a dedicated line.

The control device 100 in FIG. 1 corresponds to a combination of the control device 100 in FIG. 13 and the drawing instruction generating PC 320. For example, the backbone system 330 is a control system for commodities transported with containers. The backbone system 330 sends character strings to be printed on each thermal rewritable medium 20 to the drawing instruction generating PC 320. The character strings include a drawing target datum for commodity control such as name of commodity, time and date information, or the like. The drawing instruction generating PC 320 receives the drawing target datum and generates a drawing instruction. Any method in the first, the second, and the third embodiments can be employed as a method for generating a drawing instruction. The drawing instruction generating PC 320 sends the generated drawing instruction to the control device 100.

Figure 14:
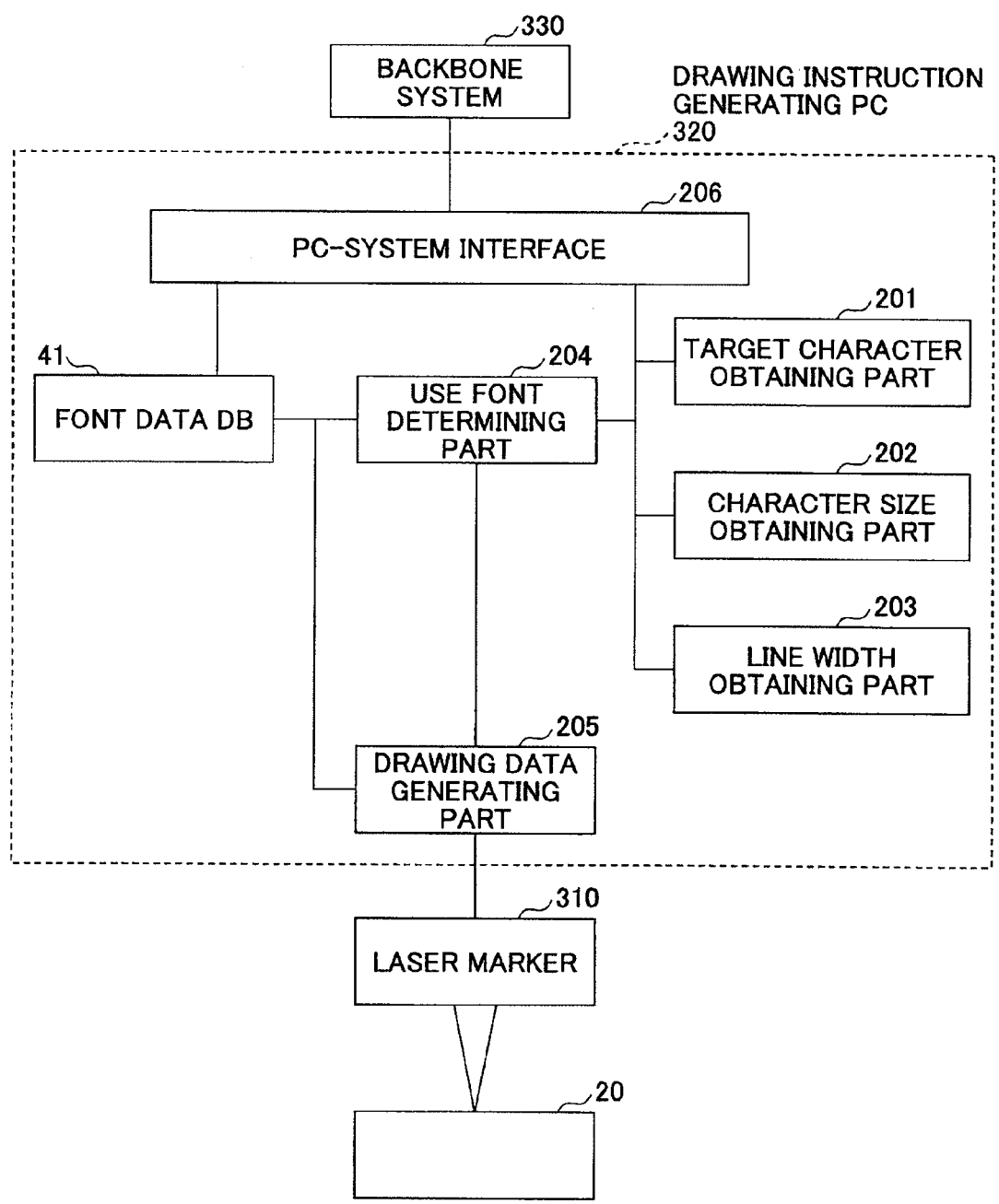
FIG. 14 is an example of a function block diagram of a laser irradiation device (the fourth embodiment).

FIG. 14 shows an example of a function block diagram of the laser irradiation device 300 of the present embodiment. In FIG. 14, the same element as the element in FIG. 5 has the same reference sign and its explanation is omitted. In FIG. 14, the drawing instruction generating PC 320 provides each of functions in FIG. 5. That is, the drawing instruction generating PC 320 selects a font datum and generates a drawing instruction.

The backbone system 330 and the drawing instruction generating PC 320 are connected through a PC-system interface 206. The PC-system interface 206 is a first network device 34b in FIG. 15 for example.

The drawing instruction generating PC 320 sends a drawing instruction to the control device 100 in a laser marker 310. The control device 100 decodes the drawing instruction, drives the direction control mirror 13, and switches on and off a laser beam to draw a character on the thermal rewritable medium 20.

Figure 15:
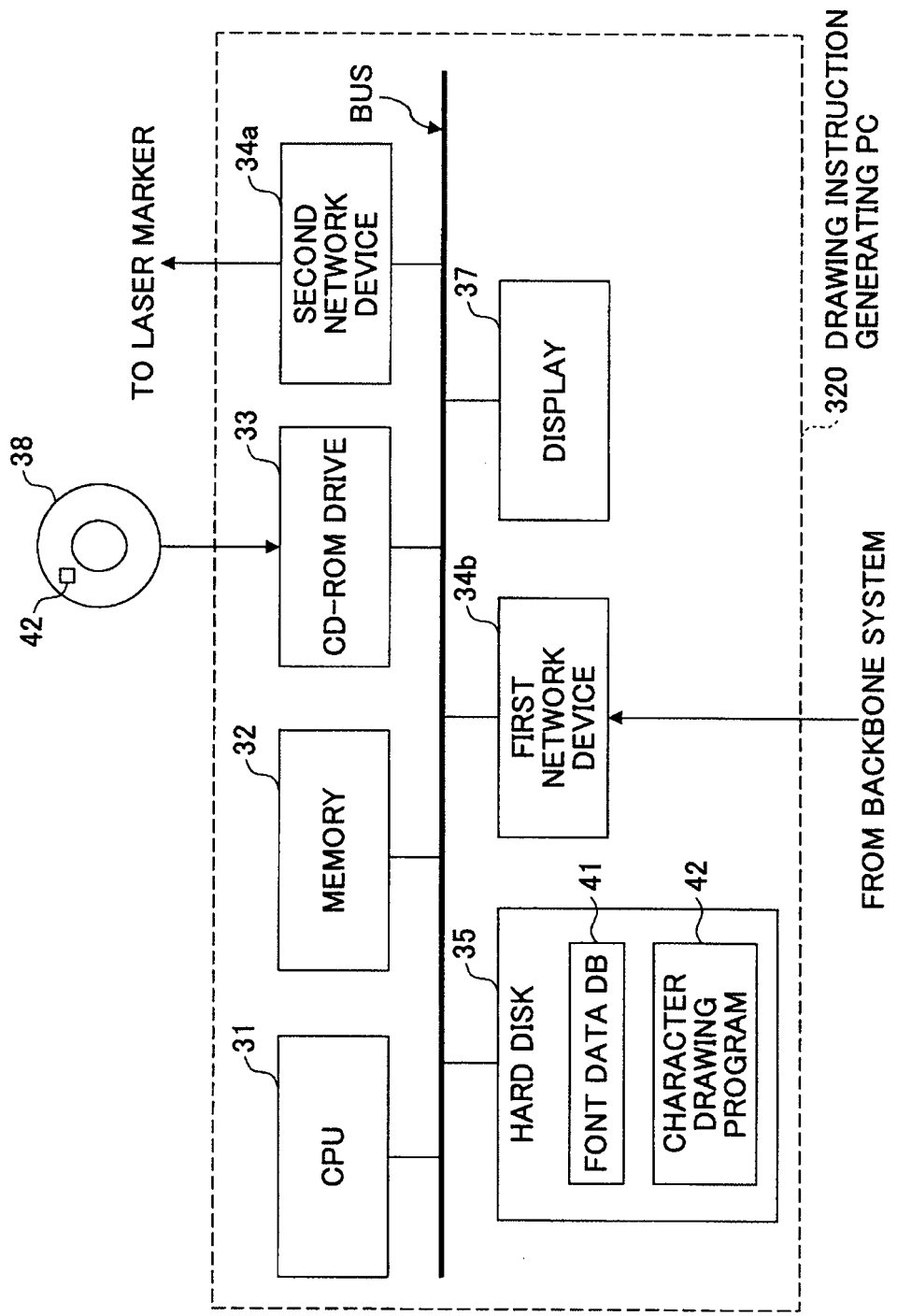
FIG. 15 is an example of a hardware configuration diagram of a PC for generating a drawing instruction.

FIG. 15 shows an example of a hardware configuration diagram of the drawing instruction generating PC 320. In FIG. 15, the same element as the element in FIG. 2 has the same reference sign and its explanation is omitted. Data which constitute a target to be drawn (for example, a character code of a character desired to be drawn, a character thickness and size, and a character attribute such as a font) are stored in the hard disk 35 or the like through the first network device 34b from the backbone system 330. A font datum necessary to draw a character is stored in the hard disk 35 by reading out from the CD-ROM 38 in advance.

The CPU 31 reads out from the storage medium 38 the character drawing program 42 for achieving the above described processes, functions, or procedures with necessary data, and sends processing results to the laser marker 310 through a second network device 34a. The CPU 31 can store the processing results in the hard disk 35, or can output the processing results to the display 37.

The present embodiment can improve the flexibility of the system so that the laser marker 310 is connected to a plurality of the drawing instruction generating PCs 320, that only the drawing instruction generating PC 320 can be moved or exchanged, or the like, because the drawing instruction generating PC 320 is separated from the laser marker 310.

The present invention is not limited to the specifically disclosed embodiments, and variations and modifications may be made without departing from the scope of the present invention.

The present application is based on Japanese priority application No. 2009-118908 filed on May 15, 2009, the entire contents of which are hereby incorporated herein by reference.

What is claimed is:

1. An information processing device for generating a piece of drawing information of a character defined by a combination of strokes and drawn by intermittently imparting energy to a chromogenic medium while changing a position to be imparted, comprising:
a shape information storing part configured to store plural pieces of shape information for the character, one of the plural pieces of shape information for the character including all strokes in the combination of strokes defining the character and a simplified piece of shape information of the plural pieces of shape information for the character omitting at least one stroke of the combination of strokes defining the character;
a thickness information obtaining part configured to obtain a piece of thickness information of the character;
a code information obtaining part configured to obtain a piece of code information of the character;
a size information obtaining part configured to obtain a piece of size information of the character;
a shape information selecting part configured to select a piece of shape information out of the plural pieces of shape information for the character based on the obtained piece of thickness information and the obtained piece of size information; and
a drawing information generating part configured to read out the piece of shape information selected by the shape information selecting part from the shape information storing part and to generate a piece of drawing information from the piece of shape information, wherein
the shape information storing part stores, for each of the plural pieces of shape information for the character, lower limit information including a thickness and an associated minimum size of the respective piece of shape information for the character drawable by the thickness,
the shape information selecting part selects one of the plural pieces of shape information for the character, by comparing a first ratio between the associated minimum size and the thickness in the lower limit information of each of the plural pieces of shape information with a second ratio between the obtained piece of size information and the obtained piece of thickness information.

2. The information processing device according to claim 1, wherein the lower limit information includes, for each thickness, a horizontal and a vertical associated minimum size drawable by the thickness.

3. The information processing device according to claim 2, wherein the shape information selecting part compares the second ratio with a third ratio between the horizontal associated minimum size and the thickness, compares the second ratio with a fourth ratio between the vertical associated minimum size and the thickness, and selects a piece of shape information for the character determined as drawable in both comparative results.

4. The information processing device according to claim 2, wherein the shape information storing part stores, for a line image, a piece of shape information for narrowing a horizontal size of the line image and a piece of shape information for narrowing a vertical size of the line image,
the shape information selecting part compares, for each line image, the second ratio with a third ratio between the horizontal associated minimum size and the line image thickness, compares the second ratio with a fourth ratio between the vertical associated minimum size and the line image thickness, and selects the shape information for narrowing a horizontal size of the line image if the line image is determined as drawable in a comparative result between the second ratio and the third ratio and determined as not drawable in a comparative result between the second ratio and the fourth ratio, or selects the shape information for narrowing a vertical size of the line image if the line image is determined as not drawable in a comparative result between the second ratio and the third ratio and determined as drawable in a comparative result between the second ratio and the fourth ratio.

5. The information processing device according to claim 1, wherein the shape information storing part stores more than two pieces of shape information for the character and stores the lower limit information for each shape information, the shape information storing part calculates the first ratio for each associated minimum size in descending order, and compares the first ratio with the second ratio, based on comparative result, if the shape information storing part determines that the character is not drawable, the shape information storing part repeats comparing the first ratio with the second ratio by calculating the first ratio from the lower limit information including the next largest associated minimum size.

6. The information processing device according to claim 5, wherein the lower limit information includes, for each thickness, a horizontal and a vertical associated minimum size drawable by the thickness.

7. The information processing device according to claim 6, wherein the shape information selecting part compares the second ratio with a third ratio between the horizontal associated minimum size and the thickness, compares the second ratio with a fourth ratio between the vertical associated minimum size and the thickness, and selects a piece of shape information for the character determined as drawable in both comparative results.

8. The information processing device according to claim 6, wherein the shape information storing part stores, for a line image, a piece of shape information for narrowing a horizontal size of the line image and a piece of shape information for narrowing a vertical size of the line image, the shape information selecting part compares, for each line image, the second ratio with a third ratio between the horizontal associated minimum size and the line image thickness, compares the second ratio with a fourth ratio between the vertical associated minimum size and the line image thickness, and selects the shape information for narrowing a horizontal size of the line image if the line image is determined as drawable in a comparative result between the second ratio and the third ratio and determined as not drawable in a comparative result between the second ratio and the fourth ratio, or selects the shape information for narrowing a vertical size of the line image if the line image is determined as not drawable in a comparative result between the second ratio and the third ratio and determined as drawable in a comparative result between the second ratio and the fourth ratio.

9. A laser irradiation device, comprising:
the information processing device according to claim 1;
a laser oscillator configured to generate a laser;
a direction control mirror configured to change an irradiation direction of the laser;
a direction control motor configured to drive the direction control mirror;
a spot diameter adjusting lens; and
a focal distance adjusting lens.

10. The information processing device according to claim 1, wherein the simplified piece of shape information of the plural pieces of shape information for the character is visually distinct from a standard piece of shape information of the plural pieces of shape information for the character.

11. The information processing device according to claim 1, wherein another one of the plural pieces of shape information for the character omits at least one stroke of the combination of strokes defining the character and differs in a number of omitted strokes from the simplified piece of shape information.

12. A control system having a device intermittently imparting energy to a chromogenic medium while changing a position to be imparted and an information processing device generating a piece of drawing information of a character to be drawn defined by a combination of strokes, characterized in that the information processing device comprises:

a shape information storing part configured to store plural pieces of shape information for the character, one of the plural pieces of shape information for the character including all strokes in the combination of strokes defining the character and a simplified piece of shape information of the plural pieces of shape information for the character omitting at least one stroke of the combination of strokes defining the character;

a thickness information obtaining part configured to obtain a piece of thickness information of the character;

a code information obtaining part configured to obtain a piece of code information of the character;

a size information obtaining part configured to obtain a piece of size information of the character;

a shape information selecting part configured to select a piece of shape information out of the plural pieces of shape information for the character based on the obtained piece of thickness information and the obtained piece of size information; and a drawing information generating part configured to read out the piece of shape information selected by the shape information selecting part from the shape information storing part and to generate a piece of drawing information from the piece of shape information, wherein the shape information storing part stores, for each of the plural pieces of shape information for the character, lower limit information including a thickness and an associated minimum size of the respective piece of shape information for the character drawable by the thickness, the shape information selecting part selects one of the plural pieces of shape information for the character, by comparing a first ratio between the associated minimum size and the thickness in the lower limit information of each of the plural pieces of shape information with a second ratio between the obtained piece of size information and the obtained piece of thickness information.

13. The control system according to claim 12, wherein the simplified piece of shape information of the plural pieces of shape information for the character is visually distinct from a standard piece of shape information of the plural pieces of shape information for the character.

14. The control system according to claim 12, wherein another one of the plural pieces of shape information for the character omits at least one stroke of the combination of strokes defining the character and differs in a number of omitted strokes from the simplified piece of shape information.

15. A drawing information generating method for generating a piece of drawing information for a character defined by a combination of strokes to be drawn by intermittently imparting energy to a chromogenic medium while changing a position to be imparted, comprising:

obtaining a piece of thickness information of the character by a thickness information obtaining part;

obtaining a piece of code information of the character by a code information obtaining part;

obtaining a piece of size information of the character by a size information obtaining part;

selecting a piece of shape information out of plural pieces of shape information for the character based on the obtained piece of thickness information and the obtained piece of size information by a shape information selecting part;

reading out, from a shape information storing part storing the plural pieces of shape information for the character, the piece of shape information being selected by the shape information selecting part, and one of the plural pieces of shape information for the character including all strokes in the combination of strokes defining the character and a simplified piece of shape information of the plural pieces of shape information for the character omitting at least one stroke of the combination of strokes defining the character; and generating a piece of drawing information from the piece of shape information by a drawing information generating part, wherein the shape information storing part stores, for each of the plural pieces of shape information for the character, lower limit information including a thickness and an associated minimum size of the respective piece of shape information for the character drawable by the thickness, in the selecting step, a piece of shape information for the character is selected by comparing a first ratio between the associated minimum size and the thickness in the lower limit information of each of the plural pieces of shape information with a second ratio between the obtained piece of size information and the obtained piece of thickness information.

16. The drawing information generating method according to claim 15, wherein the simplified piece of shape information of the plural pieces of shape information for the character is visually distinct from a standard piece of shape information of the plural pieces of shape information for the character.

17. The drawing information generating method according to claim 15, wherein another one of the plural pieces of shape information for the character omits at least one stroke of the combination of strokes defining the character and differs in a number of omitted strokes from the simplified piece of shape information.

* * * * *

UNITED STATES PATENT AND TRADEMARK OFFICE
CERTIFICATE OF CORRECTION

| | | |
|---|---|---|
| PATENT NO. | : 8,791,970 B2 | Page 1 of 1 |
| APPLICATION NO. | : 12/779259 | |
| DATED | : July 29, 2014 | |
| INVENTOR(S) | : Fumihiro Hasegawa | |

It is certified that error appears in the above-identified patent and that said Letters Patent is hereby corrected as shown below:

On the title page, Item (30), should read:

--(30)  Foreign Application Priority Data

May 15, 2009     (JP)................................2009-118908--

Signed and Sealed this

Fourth Day of November, 2014

Michelle K. Lee
*Deputy Director of the United States Patent and Trademark Office*